United States Patent
Kuzuoka et al.

(10) Patent No.: US 9,784,205 B2
(45) Date of Patent: Oct. 10, 2017

(54) METHOD AND APPARATUS FOR CONTROLLING INTERNAL-COMBUSTION ENGINE

(71) Applicant: HONDA MOTOR CO., LTD., Tokyo (JP)

(72) Inventors: Kohei Kuzuoka, Wako (JP); Tadashi Kurotani, Wako (JP); Kenji Shigetoyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/214,461

(22) Filed: Jul. 20, 2016

(65) Prior Publication Data

US 2017/0030275 A1   Feb. 2, 2017

(30) Foreign Application Priority Data

Jul. 29, 2015   (JP) .................. 2015-150015

(51) Int. Cl.
*F02D 41/00* (2006.01)
*F02D 41/30* (2006.01)
(Continued)

(52) U.S. Cl.
CPC ....... *F02D 41/3005* (2013.01); *F02D 19/061* (2013.01); *F02D 19/0649* (2013.01); *F02D 19/0686* (2013.01); *F02D 19/081* (2013.01); *F02D 19/12* (2013.01); *F02D 35/027* (2013.01); *F02D 41/005* (2013.01); *F02D 41/0025* (2013.01); *F02D 41/1497* (2013.01); *F02M 43/00* (2013.01); *G01M 15/12* (2013.01)

(58) Field of Classification Search
CPC .............. F02D 19/061; F02D 19/0649; F02D 19/0686; F02D 19/081; F02D 19/12; F02D 35/027; F02D 41/0025; F02D 41/0005; F02D 41/005; F02D 41/1497; F02D 41/3005; F02D 2200/025; F02M 43/00; G01M 15/12
USPC ......... 123/478–481, 406.21, 406.16, 406.29, 123/406.31, 406.37; 701/101–104, 108, 701/111
See application file for complete search history.

(56) References Cited

U.S. PATENT DOCUMENTS 6,655,324 B2 * 12/2003 Cohn .................. F02B 1/12
  123/1 A
2010/0132666 A1 * 6/2010 Sato .................... H01T 13/50
  123/406.19

(Continued)

FOREIGN PATENT DOCUMENTS

JP   2011-122544   6/2011

*Primary Examiner* — John Kwon
*Assistant Examiner* — Johnny H Hoang
(74) *Attorney, Agent, or Firm* — Mori & Ward, LLP

(57) ABSTRACT

A method for controlling an internal-combustion engine includes detecting knocking in the internal-combustion engine. An EGR gas quantity of EGR gas is increased in a case where the knocking is detected. A part of exhaust gas is circulated into an intake passage as the EGR gas. A fuel octane number of fuel supplied to a cylinder is increased in the case. The fuel octane number is decreased after the fuel octane number has been increased. The EGR gas quantity is maintained so as to prevent the knocking after the EGR gas quantity has been increased.

17 Claims, 13 Drawing Sheets

(51) Int. Cl.
*F02D 19/08* (2006.01)
*F02D 19/06* (2006.01)
*F02D 35/02* (2006.01)
*F02D 41/14* (2006.01)
*F02M 43/00* (2006.01)
*F02D 19/12* (2006.01)
*G01M 15/12* (2006.01)

(56) References Cited

U.S. PATENT DOCUMENTS

| | | | |
|---|---|---|---|
| 2013/0197786 A1* | 8/2013 | Genko | F02D 41/00 701/108 |
| 2014/0311450 A1* | 10/2014 | Minami | F02P 5/045 123/406.46 |
| 2015/0240775 A1* | 8/2015 | Kunze | F02P 5/152 123/406.29 |
| 2015/0285202 A1* | 10/2015 | Spohn | F02D 17/04 123/332 |
| 2016/0160810 A1* | 6/2016 | Ryu | G01M 15/11 123/568.12 |
| 2017/0107949 A1* | 4/2017 | Hakeem | F02M 25/0227 |

* cited by examiner

METHOD AND APPARATUS FOR CONTROLLING INTERNAL-COMBUSTION ENGINE

CROSS REFERENCE TO RELATED APPLICATIONS

The present application claims priority under 35 U.S.C. §119 to Japanese Patent Application No. 2015-150015, filed Jul. 29, 2015, entitled "Method and Apparatus for Controlling Internal-Combustion Engine." The contents of this application are incorporated herein by reference in their entirety.

BACKGROUND

1. Field

The present disclosure relates to a method and an apparatus for controlling an internal-combustion engine.

2. Description of the Related Art

Such a type of control apparatus of an internal-combustion engine has been developed, as described in, for example, Japanese Unexamined Patent Application Publication No. 2011-122544. In the internal-combustion engine, part of exhaust gas is recirculated into an intake passage in the form of EGR gas by an EGR system. In addition, blended fuel generated by mixing low octane number fuel and high octane number fuel is injected from a fuel injection valve, and the ratio of the high octane number fuel to the blended fuel can be changed. Furthermore, the control apparatus detects engine knocking. Upon detecting engine knocking, the control apparatus supplies EGR gas into a cylinder using the EGR system to stop the knocking first. If the engine knocking continues even after a predetermined period of time has elapsed since the start of the supply of the EGR gas, the control apparatus increases the octane number of the fuel injected from the fuel injection valve by changing the ratio of the high octane number fuel to the blended fuel.

SUMMARY

According to one aspect of the present invention, a method for controlling an internal-combustion engine, the internal-combustion engine including an EGR system capable of recirculating part of exhaust gas into an intake passage as EGR gas and changing an EGR gas quantity supplied to a cylinder, the internal-combustion engine capable of changing a fuel octane number representing an octane number of fuel supplied into the cylinder, the method includes a first step, a second step, a third step, and a fourth step. The first step is detecting knocking of the internal-combustion engine. The second step is performing augmenting control that increases the EGR gas quantity via the EGR system and increases the fuel octane number if knocking of the internal-combustion engine is detected in the first step. The third step is decreasing the fuel octane number increased through the augmenting control after the augmenting control begins. The fourth step is maintaining the EGR gas quantity at a level capable of preventing the knocking of the internal-combustion engine via the EGR system after the augmenting control is performed.

According to another aspect of the present invention, an apparatus for controlling an internal-combustion engine, the internal-combustion engine including an EGR system capable of recirculating part of exhaust gas into an intake passage as EGR gas and changing an EGR gas quantity supplied to a cylinder, the internal-combustion engine capable of changing a fuel octane number representing an octane number of fuel supplied into the cylinder, the apparatus includes a knocking detection unit, an augmenting control execution unit, a reduction unit, and a maintaining unit. The knocking detection unit detects knocking of the internal-combustion engine. The augmenting control execution unit performs augmenting control to increase the EGR gas quantity via the EGR system and increase the fuel octane number if knocking of the internal-combustion engine is detected. The reduction unit decreases the fuel octane number increased through the augmenting control after the augmenting control begins. The maintaining unit maintains the EGR gas quantity at a level capable of preventing the knocking of the internal-combustion engine via the EGR system after the augmenting control is performed.

According to further aspect of the present invention, a method for controlling an internal-combustion engine includes detecting knocking in the internal-combustion engine. An EGR gas quantity of EGR gas is increased in a case where the knocking is detected. A part of exhaust gas is circulated into an intake passage as the EGR gas. A fuel octane number of fuel supplied to a cylinder is increased in the case where the knocking is detected. The fuel octane number is decreased after the fuel octane number has been increased. The EGR gas quantity is maintained so as to prevent the knocking in the internal-combustion engine after the EGR gas quantity has been increased.

According to the other aspect of the present invention, an apparatus for controlling an internal-combustion engine, the apparatus includes a knocking detector, an augmenting controller, a reducer, and a maintainer. The knocking detector detects knocking in the internal-combustion engine. The augmenting controller increases an EGR gas quantity of EGR gas and a fuel octane number of fuel supplied to a cylinder in a case where the knocking detector detects the knocking. A part of exhaust gas is circulated into an intake passage as the EGR gas. The reducer decreases the fuel octane number after the fuel octane number has been increased. The maintainer maintains the EGR gas quantity so as to prevent the knocking in the internal-combustion engine after the fuel octane number has been increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
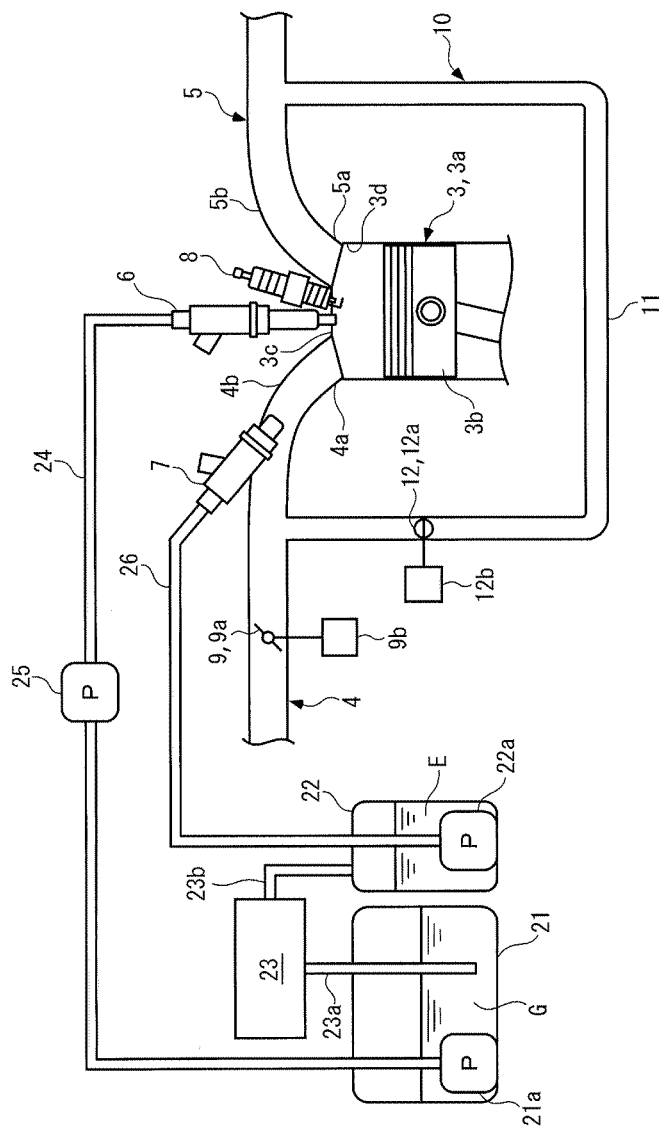
FIG. 1 is a schematic illustration of an internal-combustion engine to which a control apparatus according to an exemplary embodiment of the present disclosure is applied.

The embodiments will now be described with reference to the accompanying drawings, wherein like reference numerals designate corresponding or identical elements throughout the various drawings.

Exemplary embodiments of the present disclosure are described in detail below with reference to the accompanying drawings. FIG. 1 illustrates an internal-combustion engine 3 (hereinafter, simply referred to as an "engine" 3) to which a control apparatus 1 according to the present exemplary embodiment is applied. The engine 3 is mounted in a vehicle (not illustrated). The engine 3 uses gasoline G, which is low octane number fuel, and ethanol E, which is high octane number fuel. The gasoline G contains an approximately 10% ethanol component and is commercially available. The gasoline G is stored in a first fuel tank 21. The ethanol E contains an approximately 60% ethanol component. The ethanol E has an octane number higher than that of the gasoline G. The ethanol E is stored in a second fuel tank 22. The first fuel tank 21 and the second fuel tank 22 include low-pressure pumps 21a and 22a, respectively.

Figure 2:
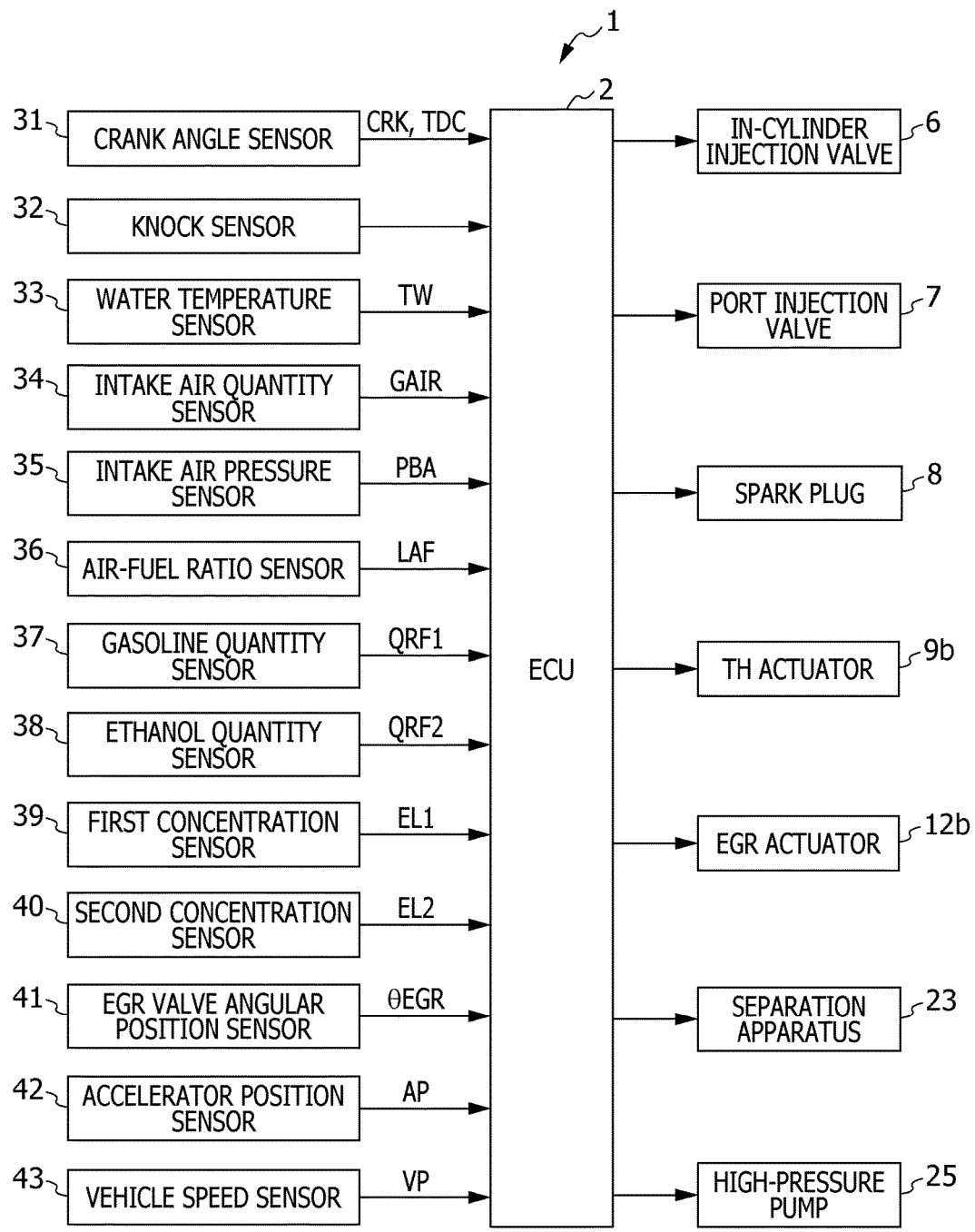
FIG. 2 is a block diagram of an ECU of the control apparatus and other devices.

According to the present exemplary embodiment, the ethanol E is produced from the gasoline G using a separation apparatus 23. The separation apparatus 23 produces the ethanol E by separating an ethanol component from the gasoline G supplied from the first fuel tank 21 via a channel 23a. In addition, the separation apparatus 23 supplies the produced ethanol E to the second fuel tank 22 via a channel 23b. The operation performed by the separation apparatus 23 is controlled by an electronic control unit (ECU) 2 (described in more detail below) of the control apparatus 1 (refer to FIG. 2). Note that to perform the separation, the separation apparatus 23 may employ a separation technique using a separation film or a separation technique using phase separation or absorption as needed.

The engine 3 has, for example, four cylinders 3a (only one is illustrated in FIG. 1). A combustion chamber 3d is formed between a piston 3b and a cylinder head 3c of each of the cylinders 3a. The combustion chamber 3d has the intake passage 4 connected thereto via an intake port 4a and an intake manifold 4b. In addition, the combustion chamber 3d has an exhaust tract 5 connected thereto via an exhaust port 5a and an exhaust manifold 5b.

Furthermore, the cylinder head 3c includes an in-cylinder injection valve 6, and the intake manifold 4b includes a port injection valve 7 for each of the cylinders 3a. Still furthermore, the cylinder head 3c includes a spark plug 8 for igniting a fuel/air mixture generated in the combustion chamber 3d for each of the cylinders 3a.

Each of the in-cylinder injection valve 6 and the port injection valve 7 is configured from a widely used solenoid or a needle valve (neither is illustrated). The in-cylinder injection valve 6 is disposed so that the top end thereof having an injection port (not illustrated) faces the combustion chamber 3d. The in-cylinder injection valve 6 is connected to the first fuel tank 21 via a gasoline supply passage 24 and a high-pressure pump 25 disposed in the middle of the gasoline supply passage 24. The port injection valve 7 is disposed so that the top end thereof having an injection port (not illustrated) faces the intake port 4a. The port injection valve 7 is connected to the second fuel tank 22 via an ethanol supply passage 26.

In the above-described configuration, the gasoline G flows from the first fuel tank 21 into the gasoline supply passage 24, and the pressure of the gasoline G is increased by the high-pressure pump 25. Thereafter, the gasoline G is supplied to the in-cylinder injection valve 6 and is directly injected from the in-cylinder injection valve 6 into the combustion chamber 3d. The pressure of the gasoline G supplied to the in-cylinder injection valve 6 can be changed by controlling the operation performed by the high-pressure pump 25 using the ECU 2. In addition, the ethanol E is supplied from the second fuel tank 22 to the port injection valve 7 via the ethanol supply passage 26. Thereafter, the ethanol E is injected from the port injection valve 7 to the intake port 4a.

In addition, the intake passage 4 includes a throttle valve 9. The throttle valve 9 includes a valve body 9a that opens or closes the intake passage 4 and a TH actuator 9b that drives the valve body 9a. The TH actuator 9b is formed from, for example, an electric motor. The TH actuator 9b is connected to the ECU 2. The angular position of the throttle valve 9 is changed by the ECU 2 so that the quantity of fresh air flowing into the cylinders 3a through the intake passage 4 is controlled.

In addition, the engine 3 includes an EGR system 10. The EGR system 10 includes an EGR passage 11 and an EGR control valve 12. The EGR passage 11 is connected to a point of the intake passage 4 downstream of the throttle valve 9 and the exhaust tract 5. The EGR passage 11 allows the exhaust gas of the engine 3 to recirculate into the intake passage 4 in the form of EGR gas. As is well known, recirculation of EGR gas decreases the combustion temperature in the combustion chamber 3d and, thus, $NO_x$ in the exhaust gas decreases. The EGR control valve 12 is disposed in the EGR passage 11. The EGR control valve 12 includes a valve body 12a and an EGR actuator 12b that drives the valve body 12a. The EGR actuator 12b is formed from, for example, an electric motor. The EGR actuator 12b is connected to the ECU 2. The angular position of the EGR control valve 12 is changed by the ECU 2 so that the quantity of EGR gas that is recirculated into the intake passage 4 through the EGR passage 11 and that is flowing into the cylinders 3a is controlled.

The engine 3 further includes a crank angle sensor 31, a knock sensor 32, and a water temperature sensor 33. The engine 3 still further includes an intake air quantity sensor 34 and an intake air pressure sensor 35 upstream and downstream of the throttle valve 9, respectively, in the intake passage 4 and an air-fuel ratio sensor 36 in the exhaust tract 5. The crank angle sensor 31 outputs, to the ECU 2, a CRK signal and a TDC signal, which are pulse signals, with the rotation of the crankshaft (refer to FIG. 2). The CRK signal is output at every predetermined angle (e.g., 1 deg.) of rotation of the crankshaft (hereinafter referred to as a "crank angle"). The ECU 2 calculates a rotational speed NE of the engine 3 (hereinafter referred to as an "engine speed") on the basis of the CRK signal. The TDC signal indicates that the piston 3b in any one of the cylinders 3a is positioned at a point close to the top dead center when the piston 3b is about to start the intake stroke. If the number of the cylinders 3a is four as in the present exemplary embodiment, the TDC signal is output at every 180 degree rotation of crank angle.

The knock sensor 32 is disposed in a cylinder block of the engine 3. The knock sensor 32 detects knocking of the engine 3 and outputs the detection signal to the ECU 2. The water temperature sensor 33 detects a temperature TW of the engine cooling water of the engine 3 (hereinafter referred to as an "engine water temperature TW") and outputs the detection signal to the ECU 2. The intake air quantity sensor 34 detects the flow rate GAIR of the fresh air flowing in the intake passage 4 (hereinafter referred to as an "intake air quantity"), and the intake air pressure sensor 35 detects a pressure PBA inside the intake passage 4 (hereinafter referred to as an "intake pressure PBA"). The detected signals are output to the ECU 2.

In addition, the air-fuel ratio sensor 36 detects an air-fuel ratio LAF of the air-fuel mixture burned in the combustion chamber 3d and outputs the detection signal to the ECU 2. Furthermore, the engine 3 includes a cylinder identifying sensor (not illustrated). The cylinder identifying sensor outputs, to the ECU 2, a cylinder identifying signal, which is a pulse signal for identifying a cylinder. The ECU 2 calculates an actual crank angle position CAACT of the crankshaft in each of the cylinders 3a on the basis of the cylinder identifying signal, the CRK signal, and the TDC signal. In such a case, the actual crank angle position CAACT is calculated as the rotation angle position of the crankshaft (hereinafter referred to as a "crank angle position") based on the TDC signal of each of the cylinders 3a (unit: deg). When the TDC signal is generated, the actual crank angle position CAACT is set to 0.

In addition, the first fuel tank 21 and the second fuel tank 22 include a gasoline level sensor 37 and an ethanol level sensor 38, respectively. The gasoline level sensor 37 detects a quantity QRF1 of the gasoline G reserved in the first fuel tank 21 (hereinafter referred to as a "gasoline quantity remaining") and outputs the detection signal to the ECU 2 (refer to FIG. 2). The ethanol level sensor 38 detects a quantity QRF2 of the ethanol E reserved in the second fuel tank 22 (hereinafter referred to as an "ethanol quantity remaining") and outputs the detection signal to the ECU 2.

In addition, the first fuel tank 21 and the second fuel tank 22 include a first concentration sensor 39 and a second concentration sensor 40, respectively. The first concentration sensor 39 detects a concentration EL1 of the ethanol component contained in the gasoline G reserved in the first fuel tank 21 (hereinafter, the concentration is referred to as a "first ethanol concentration") and outputs the detection signal to the ECU 2 (refer to FIG. 2). The second concentration sensor 40 detects a concentration EL2 of the ethanol component contained in the ethanol E reserved in the second fuel tank 22 (hereinafter, the concentration is referred to as a "second ethanol concentration") and outputs the detection signal to the ECU 2.

In addition, the EGR control valve 12 includes an EGR valve angular position sensor 41. The EGR valve angular position sensor 41 detects an angular position θEGR of the EGR control valve 12 (hereinafter referred to as an "EGR valve angular position") and outputs the detection signal to the ECU 2. Furthermore, the ECU 2 receives a position AP of an acceleration pedal (not illustrated) of the vehicle from an accelerator angular position sensor 42 (hereinafter, the position is referred to as an "accelerator angular position") and a detection signal indicating a vehicle speed VP of the vehicle from a vehicle speed sensor 43.

The ECU 2 is formed from a microcomputer including a central processing unit (CPU), a random access memory (RAM), a read only memory (ROM), and an input and output (I/O) interface (none is illustrated). Based on the detection signals output from the sensors 31 to 43, the ECU 2 controls the fuel injection period and the timing of each of the in-cylinder injection valve 6 and the port injection valve 7 and the ignition timing of the spark plug 8 in accordance with a control program stored in the ROM. In addition, the ECU 2 controls the operations performed by the throttle valve 9, the EGR control valve 12, the separation apparatus 23, and the high-pressure pump 25 described above.

The engine control process performed by the ECU 2 is described below with reference to FIGS. 3 to 6. The process is performed to control the injection period of each of the in-cylinder injection valve 6 and the port injection valve 7 and the ignition timing of the spark plug 8 for each of the cylinders 3a. In addition, the process is performed to control the EGR gas quantity supplied into the cylinder 3a via the EGR system 10. The process is repeatedly performed in synchronization with the generation of the TDC signal. In step 1 illustrated in FIG. 3 (indicated as "S1" in the drawing, and the same applies hereinafter), a basic fuel injection quantity QINJB is calculated by searching a predetermined map (not illustrated) using the calculated engine speed NE and a requested torque TREQ of the engine 3 first. The requested torque TREQ is obtained by searching a predetermined map (not illustrated) using the detected vehicle speed VP and the accelerator angular position AP.

Subsequently, a total fuel injection quantity QINJT is calculated by multiplying the basic fuel injection quantity QINJB calculated in step 1 by a correction coefficient KINJ (step 2). The correction coefficient KINJ is calculated using a predetermined feedback control algorithm so that for example, the detected air-fuel ratio LAF is a predetermined target air-fuel ratio. Note that the total fuel injection quantity QINJT is a target value of the sum of the fuel injection quantity from the in-cylinder injection valve 6 (hereinafter referred to as an "in-cylinder fuel injection quantity") and the fuel injection quantity from the port injection valve 7 (hereinafter referred to as a "port fuel injection quantity").

Subsequently, a requested ethanol concentration EREQ is calculated by searching a predetermined map (not illustrated) using the engine speed NE and the requested torque TREQ (step 3). The requested ethanol concentration EREQ is a requested value of the ethanol concentration of the fuel supplied into the combustion chamber 3d. According to the above-described map, the requested ethanol concentration EREQ is set so as to increase with increasing requested torque TREQ. Subsequently, a tentative port injection ratio RPITEM is calculated by searching a predetermined map (not illustrated) using the detected first ethanol concentration EL1 and second ethanol concentration EL2 and the requested ethanol concentration EREQ calculated in step 3 (step 4). The tentative port injection ratio RPITEM is a tentative value of the ratio of the port fuel injection quantity to the sum of the in-cylinder fuel injection quantity and the port fuel injection quantity. According to the above-described map, the tentative port injection ratio RPITEM is set to a positive value less than 1.0 so that the ethanol concentration of the fuel supplied into the combustion chamber 3d is the requested ethanol concentration EREQ.

Subsequently, a tentative EGR gas quantity EGRTEM is calculated by searching a predetermined map (not illustrated) using the engine speed NE and the requested torque TREQ (step 5). The tentative EGR gas quantity EGRTEM is a tentative value of the target value of the EGR gas quantity supplied into the cylinders 3a via the EGR system 10. According to the above-described map, the tentative EGR gas quantity EGRTEM is set so as to increase with increasing requested torque TREQ.

Subsequently, a basic ignition timing IGB is calculated by searching a predetermined map (not illustrated) using the engine speed NE and the requested torque TREQ (step 6). Thereafter, a tentative ignition timing IGTEM is calculated by multiplying the calculated basic ignition timing IGB by a correction coefficient KIG (step 7). The correction coefficient KIG is calculated on the basis of, for example, the detected engine water temperature TW. In addition, the tentative ignition timing IGTEM is a tentative value of the target value of the ignition timing of the spark plug 8. The tentative ignition timing IGTEM is calculated through steps 6 and 7 described above so as to be an optimum ignition timing of the spark plug 8 that maximizes the efficiency of the engine 3.

Subsequently, it is determined whether a knock flag F_KNOCK is "1" (step 8). The knock flag F_KNOCK of "1" indicates that knocking has occurred during the previous combustion cycle of the engine 3. It is determined whether knocking occurs on the basis of the above-described detection signal of the knock sensor 32 through a determination process (not illustrated) performed independently from the engine control process.

If the answer of step 8 is NO (F_KNOCK=0) and, thus, knocking of the engine 3 has not occurred, a non-knocking control process (described below) is performed (step 9). Thereafter, the processing is completed. However, if the answer of step 8 is YES (F_KNOCK=1) and, thus, knocking of the engine 3 has occurred, a knocking control process (described below) is performed (step 10). Thereafter, the processing is completed.

Figure 3:
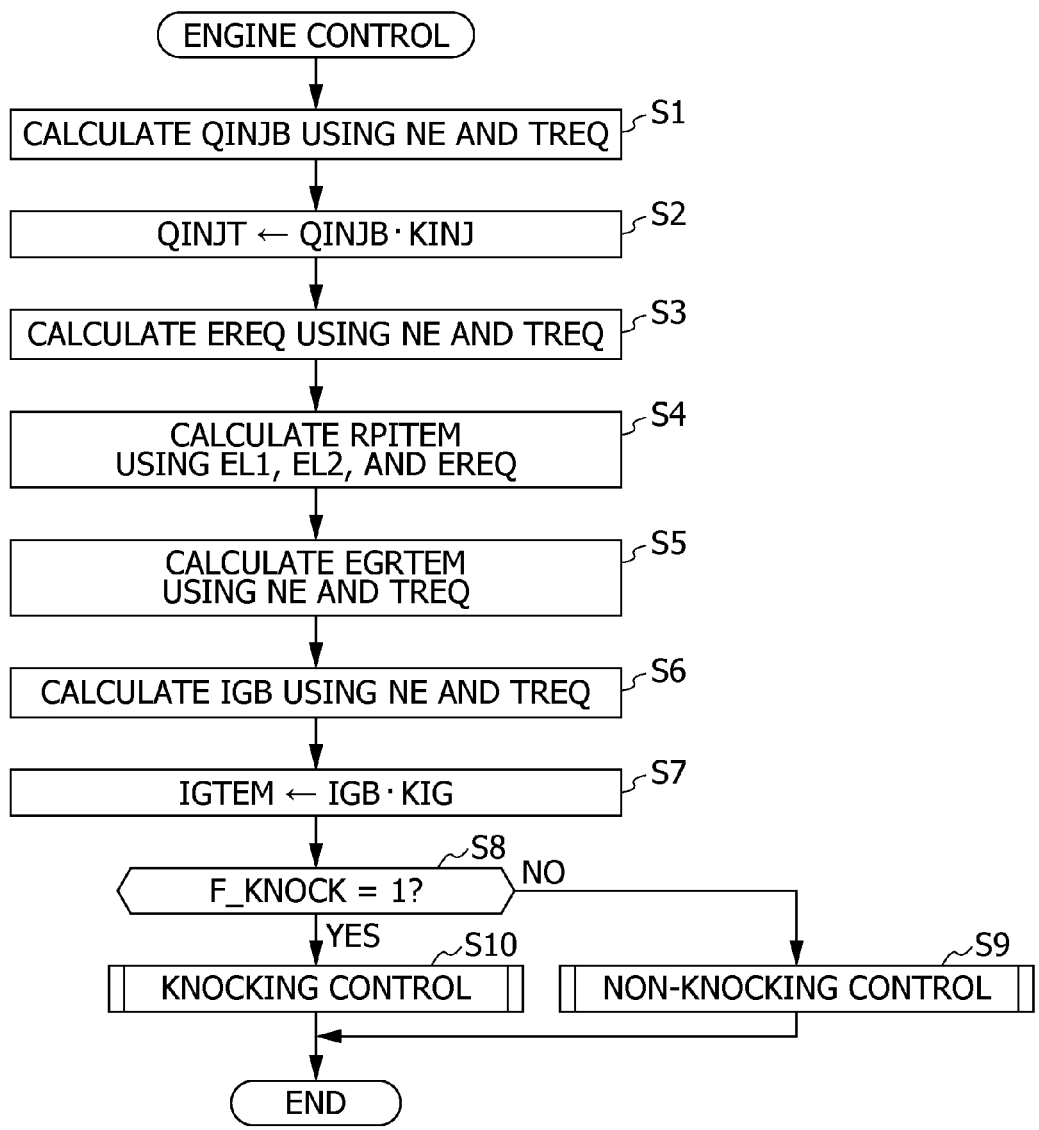
FIG. 3 is a flowchart of an engine control process performed by the ECU.
Figure 4:
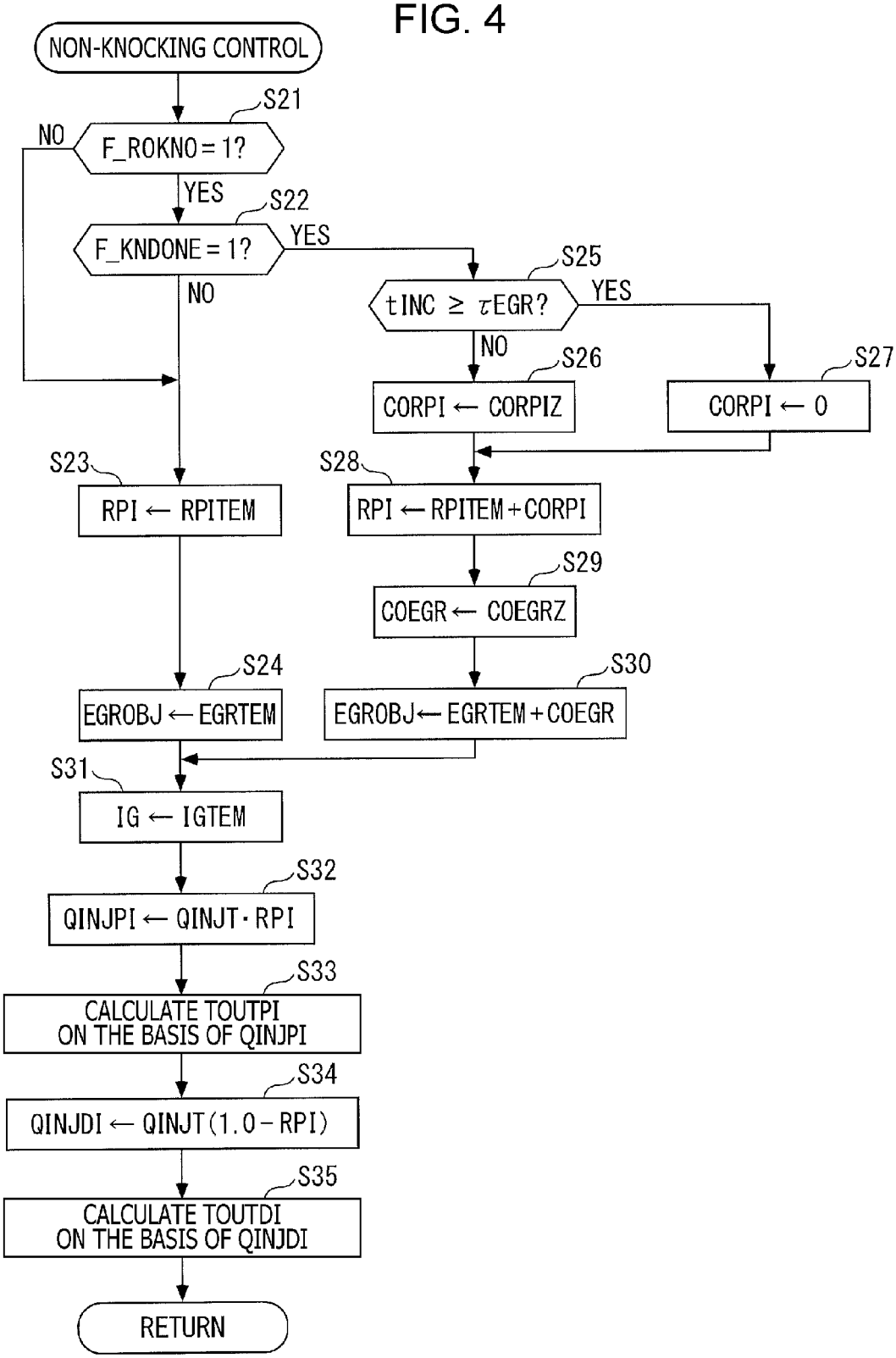
FIG. 4 is a flowchart of a subroutine of a non-knocking control process performed in step 9 illustrated in FIG. 3.

FIG. 4 illustrates the non-knocking control process performed in step 9 illustrated in FIG. 3. In step 21 illustrated in FIG. 4, it is determined whether a knock load range flag F_ROKNO is "1" first. The knock load range flag F_ROKNO of "1" indicates that the load of the engine 3, that is, the requested torque TREQ is within a predetermined knock load range in which knocking of the engine 3 occurs. The knock load range is set so as to be located in middle-load to high-load range.

If the answer of step 21 is YES (F_ROKNO=1) and the load of the engine 3 is within the knock load range, it is determined whether a knock occurrence flag F_KNDONE is "1" (step 22). The knock occurrence flag F_KNDONE of "1" indicates that knocking of the engine 3 has already occurred. The knock occurrence flag F_KNDONE is reset to "0" when the engine 3 is started. If the answer of step 22 is NO (F_KNDONE=0), that is, if knocking of the engine 3 has never occurred since the start of the engine 3, a port injection ratio RPI is set to the tentative port injection ratio RPITEM calculated in step 4 illustrated in FIG. 3 (step 23). In addition, a target EGR gas quantity EGROBJ is set to the tentative EGR gas quantity EGRTEM calculated in step 5 illustrated in FIG. 3 (step 24). Thereafter, the processing proceeds to step 31.

However, if the answer of step 22 is YES (F_KNDONE=1), that is, if the knocking of the engine 3 that occurred has already been stopped, it is determined whether a timer value tINC of an elapsed timer is greater than or equal to an EGR delay time τEGR (step 25). The elapsed timer is used to measure the elapsed time since the beginning of augmenting control. In addition, the EGR delay time τEGR indicates a delay time between the beginning of the augmenting control and a time when an increase in the EGR gas quantity is stopped and becomes stable. The timer value tINC and the EGR delay time τEGR are set in the knocking control process performed in step 10 illustrated in FIG. 3. Note that the augmenting control is performed to increase the port injection ratio RPI and the EGR gas quantity in order to stop (avoid) the knocking of the engine 3. The augmenting control is described in more detail below.

If the answer of step 25 is NO (tINC<τEGR) and, thus, the EGR delay time τEGR has not elapsed since the beginning of the augmenting control, a port injection ratio correction term CORPI used to correct the port injection ratio RPI is set to a previous port injection ratio correction term CORPIZ (step 26). Thereafter, the processing proceeds to step 28. Note that the port injection ratio correction term CORPI is reset to 0 when the engine 3 is started. However, if the answer of step 25 is YES (tINC≥τEGR) and, thus, the EGR delay time τEGR has elapsed since the beginning of the augmenting control, the augmenting control is completed. Thereafter, the port injection ratio correction term CORPI is set to 0 (step 27), and the processing proceeds to step 28.

In step 28 that follows step 26 or 27, the port injection ratio RPI is calculated by adding the port injection ratio correction term CORPI set in step 26 or 27 to the tentative port injection ratio RPITEM calculated in step 4 illustrated in FIG. 3. Subsequently, an EGR gas correction term COEGR used to correct the target EGR gas quantity EGROBJ is set to the previous value COEGRZ (step 29). Thereafter, the target EGR gas quantity EGROBJ is calculated by adding the EGR gas correction term COEGR set in step 29 to the tentative EGR gas quantity EGRTEM calculated in step 5 illustrated in FIG. 3 (step 30), and the processing proceeds to step 31.

After the target EGR gas quantity EGROBJ is calculated in this manner (step 24 or 30), the EGR valve angular position θEGR is changed on the basis of the calculated target EGR gas quantity EGROBJ. Thus, the EGR gas quantity supplied into the cylinders 3a via the EGR system 10 is controlled so as to be the same as the target EGR gas quantity EGROBJ.

However, if the answer of step 21 is NO (F_ROKNO=0) and, thus, the load of the engine 3 is not within the knock load range, the process in step 22 is skipped. Thereafter, the processes in step 23 and the subsequent steps are performed.

In step 31 that follows step 24 or 30, an ignition timing IG is set to the tentative ignition timing IGTEM calculated in step 7 illustrated in FIG. 3. After the ignition timing IG is calculated in this manner, control is performed so that the ignition timing of the spark plug 8 is the calculated ignition timing IG. Note that the ignition timing IG is more retarded with increasing value of the ignition timing IG.

In step 32 that follows step 31, a target port fuel injection quantity QINJPI is calculated by multiplying the total fuel injection quantity QINJT calculated in step 2 illustrated in FIG. 3 by the port injection ratio RPI set in step 23 or 28 illustrated in FIG. 4. Subsequently, a final port injection period TOUTPI, which is a target value of valve opening period of the port injection valve 7, is calculated on the basis of the calculated target port fuel injection quantity QINJPI (step 33). If the final port injection period TOUTPI is calculated in this manner, the port injection valve 7 is made open at the port injection start time calculated in a process (not illustrated) and is controlled so that the valve opening period is the same as the final port injection period TOUTPI. As a result, the port fuel injection quantity of the port injection valve 7 is controlled so as to be the target port fuel injection quantity QINJPI calculated in step 32.

In step 34 that follows step 33, a target in-cylinder fuel injection quantity QINJDI is calculated by multiplying the total fuel injection quantity QINJT by an in-cylinder injection ratio, which is a value obtained by subtracting the port injection ratio RPI from a value of 1.0 (i.e., QINJDI=QINJT (1.0−RPI)). Subsequently, a final in-cylinder injection period TOUTDI, which is a target value of the valve opening period of the in-cylinder injection valve 6, is calculated on the basis of the calculated target in-cylinder fuel injection quantity QINJDI (step 35). Thereafter, the processing is completed. After the final in-cylinder injection period TOUTDI is calculated in the above-described manner, the in-cylinder injection valve 6 is made open at an in-cylinder injection start time calculated in a process (not illustrated) and is controlled so that the valve opening period is the final in-cylinder injection period TOUTDI. As a result, the in-cylinder fuel injection quantity of the in-cylinder injection valve 6 is controlled so as to be the target in-cylinder fuel injection quantity QINJDI calculated in step 34.

The knocking control process performed in step 10 illustrated in FIG. 3 is described below with reference to FIGS. 5 and 6. In step 41 illustrated in FIG. 5, it is determined whether an ethanol use permit flag F_AVEIE "1". The ethanol use permit flag F_AVEIE of "1" indicates that use of the ethanol E is permitted. If the detected ethanol quantity remaining QRF2 is greater than or equal to a predetermined lower limit, the ethanol use permit flag F_AVEIE is set to "1".

If the answer of step 41 is YES (F_AVEIE=1) and, thus, use of the ethanol E is permitted, it is determined whether the knock occurrence flag F_KNDONE is "0" (step 42). If the answer is "YES" (F_KNDONE=0), that is, if knocking occurs during the previous combustion cycle for the first time after the start of the engine 3, the knock occurrence flag F_KNDONE is set to "1" (step 43). Subsequently, in step 44 and the subsequent steps, the augmenting control for increasing both the port injection ratio RPI and the EGR gas quantity is started in order to prevent knocking of the engine 3.

In step 44, a first EGR delay time τEGR1 is calculated by searching a predetermined map (not illustrated) using the detected intake air quantity GAIR, the detected intake pressure PBA, and the detected EGR valve angular position θEGR. The first EGR delay time τEGR1 represents a delay time between the beginning of the augmenting correction of the EGR gas quantity using an initial correction term COEGRIN (described below) and a time when an increase in the EGR gas quantity is stopped and becomes stable. In the above-described map, the first EGR delay time τEGR1 is set to a greater value (a longer time) with increasing intake air quantity GAIR, increasing intake pressure PBA, and increasing EGR valve angular position θEGR.

Subsequently, the EGR delay time τEGR is set to the calculated first EGR delay time τEGR1 (step 45). To measure the elapsed time from the beginning of the augmenting control, a count-up operation of the timer value tINC of the elapsed timer is started (step 46). In this manner, the timer value tINC is counted up from 0. Subsequently, the port injection ratio correction term CORPI is set to an initial correction term CORPIIN thereof (step 47). In addition, the EGR gas correction term COEGR is set to the initial correction term COEGRIN thereof (step 48). Thereafter, the processing proceeds to step 61 illustrated in FIG. 6 (described in more detail below). The initial correction terms CORPIIN and COEGRIN are set to values that can prevent the knocking of the engine 3.

However, if the answer of step 42 is NO (F_KNDONE=1) and, thus, the knocking of the engine 3 has already been detected (knocking has been occurred a plurality of times including the occurrence of knocking during the previous combustion cycle), it is determined whether the timer value tINC of the elapsed timer is greater than or equal to the EGR delay time τEGR (step 49). If the answer is NO (tINC<τEGR) and, thus, the EGR delay time τEGR has not been elapsed since the beginning of the augmenting control, an extended period of time τADD is calculated (step 50). The extended period of time τADD is used to extend the EGR delay time τEGR, since the EGR gas correction term COEGR is increased by addition of an additional term CAEGR to the EGR gas correction term COEGR performed in step 53. Like the first EGR delay time τEGR1, the extended period of time τADD is calculated by searching a predetermined map using the intake air quantity GAIR, the intake pressure PBA, and the EGR valve angular position θEGR. The map indicates a relationship among a delay time required for increasing the EGR gas quantity by a value corresponding to the additional term CAEGR, the intake air quantity GAIR, the intake pressure PBA, and the EGR valve angular position θEGR. The map is generated through an experiment in advance.

Subsequently, the EGR delay time τEGR is set (updated) to a value obtained by adding the extended period of time τADD calculated in step 50 to the EGR delay time τEGR (step 51). Thereafter, the current port injection ratio correction term CORPI is calculated by adding a predetermined additional term CARPI to the previous value CORPIZ of the port injection ratio correction term (step 52). Subsequently, the current EGR gas correction term COEGR is calculated by adding the predetermined additional term CAEGR to the previous value COEGRZ of the EGR gas correction term (step 53). Thereafter, the processing proceeds to step 61 illustrated in FIG. 6. The additional terms CARPI and CAEGR are set to values less than the initial correction terms CORPIIN and COEGRIN, respectively.

However, if the answer of step 49 is YES (tINC τEGR) and, thus, the EGR delay time τEGR has elapsed since the beginning of the augmenting control, the augmenting control to be performed after the EGR delay time elapses is performed in step 54 that follows step 49 and in the subsequent steps. In step 54, a second EGR delay time τEGR2 is calculated by searching a predetermined map (not illustrated) using the intake air quantity GAIR, the intake pressure PBA, and the EGR valve angular position θEGR first. The second EGR delay time τEGR2 represents a delay time between the beginning of the augmenting correction (augmenting control) of the EGR gas quantity using the EGR gas correction term COEGR corrected by the additional term CAEGR and a time when an increase in the EGR gas quantity is stopped and becomes stable. In the above-described map, like the first EGR delay time τEGR1, the second EGR delay time τEGR2 is set to a greater value with increasing intake air quantity GAIR, increasing intake pressure PBA, and increasing EGR valve angular position θEGR.

Subsequently, the EGR delay time τEGR is set to the calculated second EGR delay time τEGR2 (step 55), and a count-up operation of the timer value tINC of the elapsed timer is started (step 56). In addition, the processes in step 52 and the subsequent steps are performed. In this manner, after the process in step 56 is performed, the timer value tINC indicates the elapsed time since the beginning of the augmenting control to be performed after the EGR delay time has elapsed.

Note that if the answer of step 49 is YES (tINC τEGR) and the process in step 27 illustrated in FIG. 4 has already been performed, the previous value CORPIZ of the port injection ratio correction term is set to 0. In such a case, as the previous value CORPIZ in step 52 illustrated in FIG. 5, the port injection ratio correction term CORPI stored in the RAM immediately before the answer of step 25 illustrated in FIG. 4 became YES is used.

Figure 5:
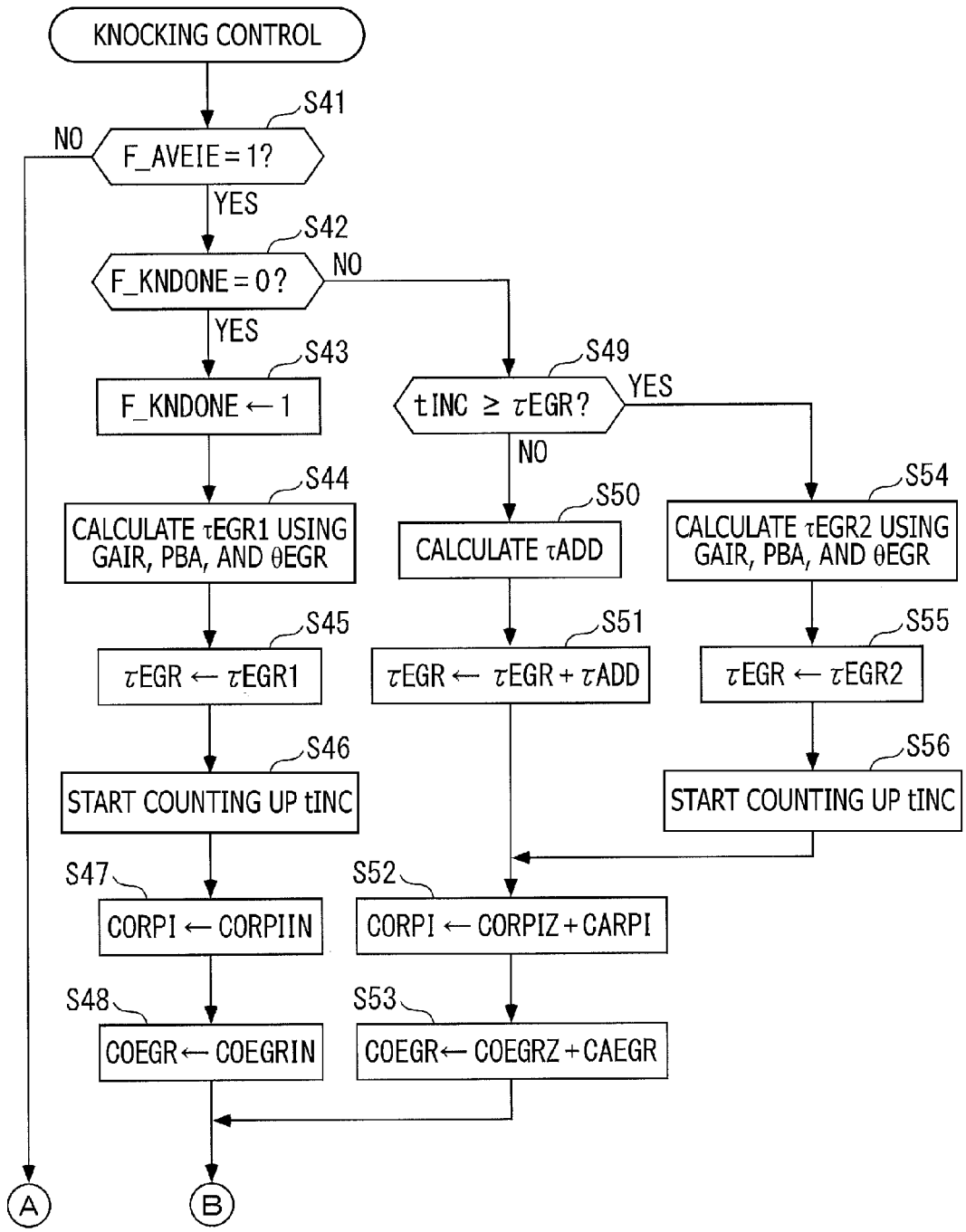
FIG. 5 is a flowchart of a subroutine of a knocking control process performed in step 10 illustrated in FIG. 3.
Figure 6:
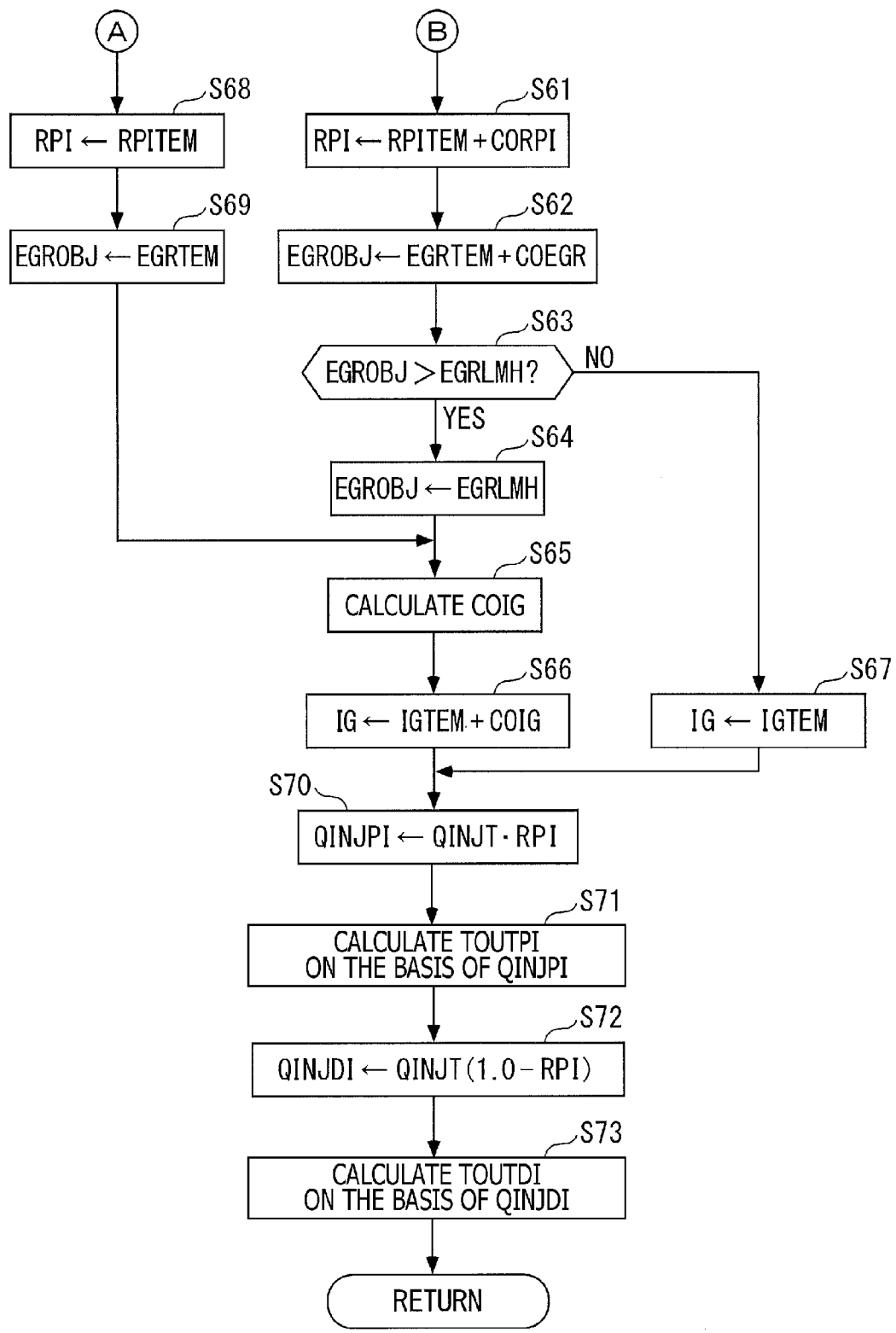
FIG. 6 is a continuation of the flowchart of FIG. 5.

In step 61 that follows step 48 or 53 illustrated in FIG. 6, the port injection ratio RPI is calculated by adding the port injection ratio correction term CORPI calculated in step 47 or 52 illustrated in FIG. 5 to the tentative port injection ratio RPITEM calculated in step 4 illustrated in FIG. 3. Subsequently, the target EGR gas quantity EGROBJ is calculated by adding the EGR gas correction term COEGR calculated in step 48 or 53 illustrated in FIG. 5 to the tentative EGR gas quantity EGRTEM calculated in step 5 illustrated in FIG. 3 (step 62).

Subsequently, it is determined whether the target EGR gas quantity EGROBJ calculated in step 62 is greater than a predetermined upper limit EGRLMH (step 63). If the answer is YES (EGROBJ>EGRLMH), the target EGR gas quantity EGROBJ is set to the upper limit EGRLMH (step 64), and an ignition timing correction term COIG is calculated (step 65). When the process in step 65 is performed for the first time after the start of the engine 3, the ignition timing correction term COIG is set to a relatively small positive value. Thereafter, if the answer of step 63 is YES and, thus, the target EGR gas quantity EGROBJ is continuously restricted to the upper limit EGRLMH, the ignition timing correction term COIG is set to a value obtained by adding a predetermined positive additional term CAIG to the previous value COIGZ (COIG←COIGZ+CAIG). In this manner, the ignition timing correction term COIG is calculated as a larger value as the period of time during which the target EGR gas quantity EGROBJ is restricted to the upper limit EGRLMH increases.

Subsequently, the ignition timing IG is calculated by adding the ignition timing correction term COIG calculated in step 65 to the tentative ignition timing IGTEM calculated in step 7 illustrated in FIG. 3 (step 66). Thereafter, the processing proceeds to step 70 (described in more detail below). In this manner, the ignition timing IG is corrected so as to be more retarded than the tentative ignition timing IGTEM.

However, if the answer of step 63 is NO (EGROBJ≤EGRLMH), the ignition timing IG is set to the tentative ignition timing IGTEM calculated in step 7 illustrated in FIG. 3 (step 67). Thereafter, the processing proceeds to step 70.

However, if the answer of step 41 illustrated in FIG. 5 is NO (F_AVEIE=0) and, thus, use of the ethanol E is not permitted, the port injection ratio RPI is set to the tentative port injection ratio RPITEM calculated in step 4 illustrated in FIG. 3 (step 68). In addition, the target EGR gas quantity EGROBJ is set to the tentative EGR gas quantity EGRTEM calculated in step 5 illustrated in FIG. 3 (step 69). Thereafter, the processes in step 65 and the subsequent steps are performed.

After the target EGR gas quantity EGROBJ and the ignition timing IG are calculated in this manner, the process similar to the non-knocking control process is performed. That is, control is performed so that the EGR gas quantity is set to the target EGR gas quantity EGROBJ by changing the EGR valve angular position θEGR on the basis of the target EGR gas quantity EGROBJ calculated in step 62, 64, or 69. In addition, control is performed so that the ignition timing of the spark plug 8 is the ignition timing IG set in step 66 or 67.

Steps 70 to 73 that follows step 66 or 67 are similar to steps 32 to 35 illustrated in FIG. 4, respectively. That is, the target port fuel injection quantity QINJPI, the final port injection period TOUTPI, the target in-cylinder fuel injection quantity QINJDI, and the final in-cylinder injection period TOUTDI are similarly calculated. That is, the target port fuel injection quantity QINJPI is calculated by multiplying the total fuel injection quantity QINJT calculated in step 2 illustrated in FIG. 3 by the port injection ratio RPI calculated in step 61 or 68 (step 70). Subsequently, the final port injection period TOUTPI is calculated on the basis of the calculated target port fuel injection quantity QINJPI (step 71). After the final port injection period TOUTPI is calculated in the above-described manner, the port injection valve 7 is made open at the port injection start time and is controlled so that the period of time during which the port injection valve 7 is being open is the final port injection period TOUTPI. As a result, control is performed so that the port fuel injection quantity of the port injection valve 7 is the target port fuel injection quantity QINJPI calculated in step 70.

In step 72, the target in-cylinder fuel injection quantity QINJDI is calculated by multiplying the total fuel injection quantity QINJT by the in-cylinder injection ratio obtained by subtracting the port injection ratio RPI from the value 1.0. Subsequently, the final in-cylinder injection period TOUTDI, which is a target value of the valve opening period of the in-cylinder injection valve 6, is calculated on the basis of the calculated target in-cylinder fuel injection quantity QINJDI (step 73). Thereafter, the processing is completed. After the final in-cylinder injection period TOUTDI is calculated in the above-described manner, the in-cylinder injection valve 6 is made open at the in-cylinder injection start time and is controlled so that the period of time during which the in-cylinder injection valve 6 is being open is the final in-cylinder injection period TOUTDI. As a result, control is performed so that the in-cylinder fuel injection quantity of the in-cylinder injection valve 6 is the target in-cylinder fuel injection quantity QINJDI calculated in step 72.

Figure 7:
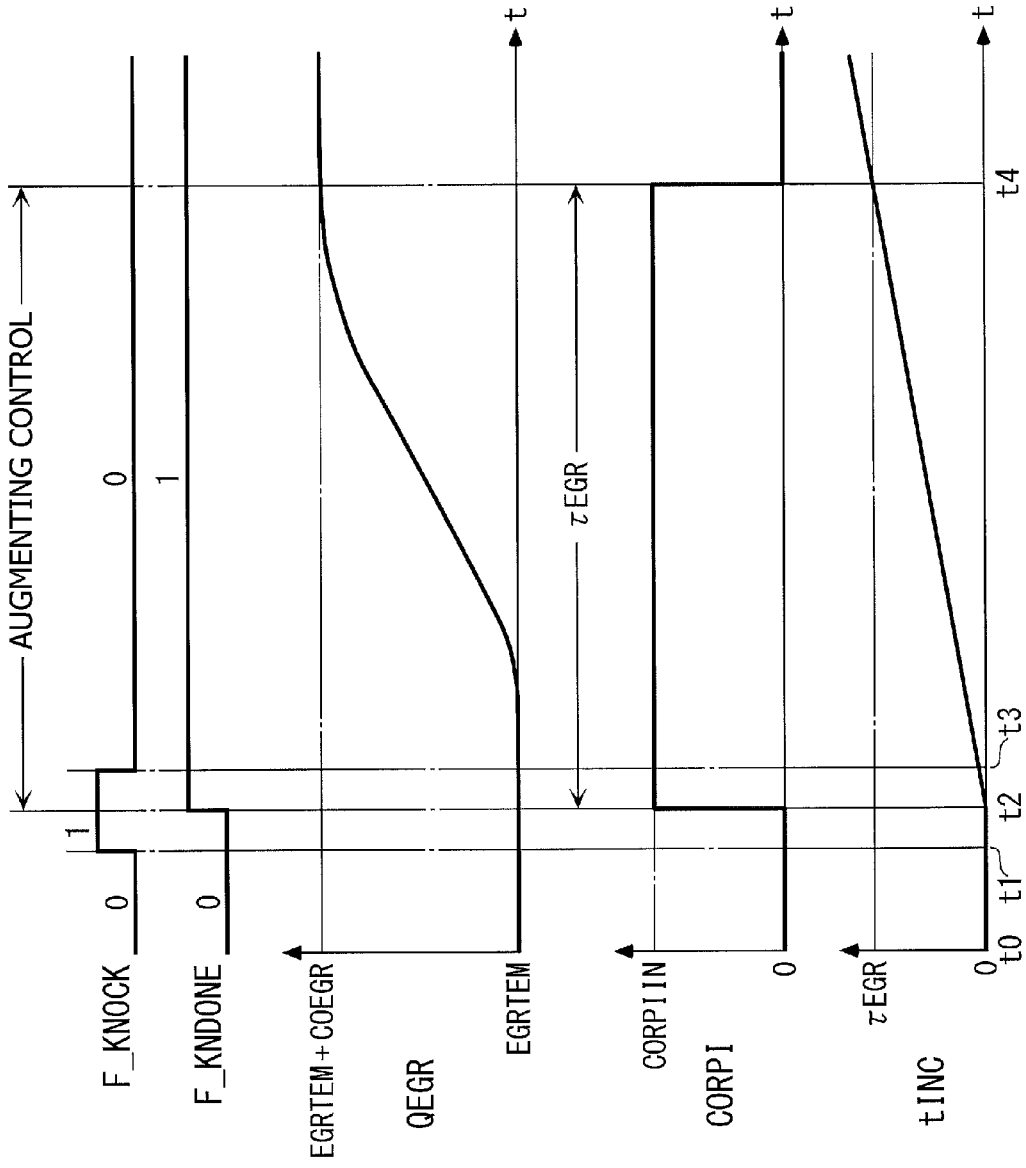
FIG. 7 is a timing diagram illustrating an example of the operation of an engine control process according to a first exemplary embodiment.

FIG. 7 illustrates an example of the operation of the above-described engine control process. In FIG. 7, the actual EGR gas quantity QEGR supplied into the cylinder 3*a* is illustrated. Note that in this example of the operation, knocking is stopped immediately after the beginning of the augmenting control for stopping the knocking of the engine 3. As illustrated in FIG. 7, if no knocking has been occurred since start of the engine 3 (the period of time from the time t0 to a time immediately before the time t1, F_KNOCK=0, and F_KNDONE=0), the non-knocking control process is performed (step 9 illustrated in FIG. 3, step 22 illustrated in FIG. 4: NO). During the non-knocking control process, control is performed so that the port injection ratio RPI is set to the tentative port injection ratio RPITEM (step 23) and, in addition, an EGR gas quantity QEGR is set to the target EGR gas quantity EGROBJ set for the tentative EGR gas quantity EGRTEM (step 24). Furthermore, since the port injection ratio correction term CORPI is reset to 0 when the engine 3 is started, the port injection ratio correction term CORPI of 0 is kept.

Thereafter, if knocking of the engine 3 occurs (at the time t1), the knock flag F_KNOCK is set to "1". In the engine control process performed immediately after the occurrence of knocking (at the time t2), the knocking control process is performed (step 10 illustrated in FIG. 3) so that the knock occurrence flag F_KNDONE is set to "1" (step 43 illustrated in FIG. 5) and, in addition, the augmenting control is started (step 44 and the subsequent steps). In the augmenting control, the EGR delay time τEGR is set (steps 44 and 45), and the count-up operation of the timer value tINC of the elapsed timer is started (step 46). In addition, the port injection ratio correction term CORPI and the EGR gas correction term COEGR are set to the initial correction terms CORPIIN and COEGRIN, respectively (steps 47 and 48). Furthermore, in the augmenting control, the port injection ratio RPI is calculated so as to be a value obtained by adding the port injection ratio correction term CORPI to the tentative port injection ratio RPITEM (step 61 illustrated in FIG. 6). In addition, the EGR gas quantity QEGR is set to the target EGR gas quantity EGROBJ, which is the sum of the tentative EGR gas quantity EGRTEM and the EGR gas correction term COEGR (step 62).

As described above, the EGR gas recirculates from the exhaust tract 5 into the intake passage 4 via the EGR passage 11 and flows into the cylinders 3a. In addition, the EGR gas quantity is adjusted by changing the EGR valve angular position θEGR of the EGR control valve 12 disposed in the EGR passage 11. Accordingly, as illustrated in FIG. 7, even when the augmenting control is started, the EGR gas quantity QEGR does not immediately increase due to the EGR gas correction term COEGR and gradually increases with a delay. In steps 44 and 45 illustrated n FIG. 5, the EGR delay time τEGR is set to such an EGR gas quantity QEGR.

After the knocking of the engine 3 is stopped and, thus, the knock flag F_KNOCK is set to "0" (at a time t3), the non-knocking control process is performed again. In the non-knocking control process, if the EGR delay time τEGR has not elapsed (during a period of time from a time t3 to a time immediately before a time t4), the port injection ratio correction term CORPI and the EGR gas correction term COEGR stay at the previous values CORPI and COEGR, that is, the initial correction terms CORPIIN and COEGRIN, respectively (steps 26 and 29 illustrated in FIG. 4). In addition, the control is continuously performed so that the port injection ratio RPI is continuously set to the sum of RPITEM and CORPI (step 28) and, in addition, the EGR gas quantity QEGR is set to the sum of EGRTEM and COEGR (step 30). In this manner, the augmenting control is continuously performed.

After the knocking of the engine 3 stops, if the EGR delay time τEGR has elapsed since the beginning of the augmenting control (at the time t4, step 25 illustrated in FIG. 4: YES), the augmenting control is completed. Thereafter, the port injection ratio correction term CORPI is set to 0 (step 27). As a result, the port injection ratio RPI is set to the tentative port injection ratio RPITEM (step 28). As described above, the augmenting control is started when the knocking of the engine 3 is detected. Thereafter, the augmenting control is completed if the knocking is stopped (prevented) and the EGR delay time τEGR elapses. In addition, the target EGR gas quantity EGROBJ is continuously maintained at the sum of the tentative EGR gas quantity EGRTEM and the EGR gas correction term COEGR (steps 29 and 30). Furthermore, the EGR gas quantity QEGR converges to the target EGR gas quantity EGROBJ (=EGRTEM+COEGR) after the EGR gas delay time τEGR has elapsed since the beginning of the augmenting control. Thereafter, the EGR gas quantity QEGR of the converged value EGROBJ is continuously maintained.

Although not illustrated in FIG. 7, if knocking of the engine 3 occurs again after the beginning of the augmenting control (step 49: NO), the port injection ratio correction term CORPI and the EGR gas correction term COEGR are calculated by adding the additional terms CARPI and CAEGR to the previous values CORPIZ and COEGRZ thereof, respectively (steps 52 and 53 illustrated in FIG. 5). In this manner, the port injection ratio RPI and the EGR gas quantity QEGR are further adjusted to larger values (steps 61 and 62 illustrated in FIG. 6) and, thus, the knocking is stopped.

In addition, if knocking occurs again before the EGR delay time τEGR has elapsed since the beginning of the augmenting control (step 49: NO), the EGR delay time τEGR is calculated to be a value obtained by adding the extended period of time τADD to the EGR delay time τEGR so as to match the EGR gas correction term COEGR increased in the above-described manner (step 51). Accordingly, the EGR delay time τEGR can be reset to an appropriate value.

However, if knocking occurs again after the EGR delay time τEGR has elapsed (step 49: YES), the augmenting control is performed again to reset the EGR delay time τEGR (steps 54 and 55). In addition, a count-up operation of the timer value tINC of the elapsed timer is performed from 0 again (step 56). This is performed for the following reason. That is, since the EGR delay time τEGR has elapsed since beginning of the augmenting control, it is highly likely that the EGR gas quantity QEGR has been increased and remains stable. Accordingly, a new delay time required until the EGR gas quantity QEGR increases due to the augmenting control using the additional term CAEGR and becomes stable is calculated.

As described above, the EGR gas correction term COEGR is calculated to be a larger value as the knocking of the engine 3 continues for a longer time. In addition, after the knocking stops, the EGR gas correction term COEGR is set to the previous value COEGRZ and is maintained at that value. Furthermore, after knocking occurs, the target EGR gas quantity EGROBJ is adjusted to be increased using the EGR gas correction term COEGR even if the knocking stops. In this manner, after the augmenting control is performed, the EGR gas quantity QEGR is maintained at a value that can prevent knocking.

Note that although in a rare case, the knocking of the engine 3 does not stop depending on the drive condition of the engine 3 and the external temperature of the engine 3 even when the target EGR gas quantity EGROBJ is set to the above-described upper limit EGRLMH. In such a case, the ignition timing IG is adjusted to be retarded using the ignition timing correction term COIG (step 66 illustrated in FIG. 6). Thus, knocking can be appropriately stopped. In addition, even when the ethanol quantity remaining QRF2 is relatively low and, thus, the ethanol E is not permitted, the ignition timing IG is adjusted to be retarded (step 66) without performing the augmenting control (steps 68 and 69 illustrated in FIG. 6). In this manner, knocking can be appropriately stopped.

Note that like the target EGR gas quantity EGROBJ, the port injection ratio RPI is restricted to a value less than or equal to a predetermined upper limit (e.g., 1.0) through a restriction process (not illustrated). Even in such a case, the ignition timing IG is adjusted to be retarded.

Note that a correspondence between an element of the first exemplary embodiment and an element of the present disclosure is as follows. That is, the in-cylinder injection valve 6 and the port injection valve 7 according to the first exemplary embodiment correspond to a first injection device and a second injection device of the present disclosure, respectively. The gasoline G and the ethanol E according to the first exemplary embodiment correspond to the low octane number fuel and the high octane number fuel of the present disclosure, respectively. In addition, the intake air quantity sensor 34, the intake air pressure sensor 35, and the EGR valve angular position sensor 41 according to the first exemplary embodiment correspond to a parameter detection unit of the present disclosure. The knock sensor 32 and the ECU 2 according to the first exemplary embodiment correspond to a knocking detection unit (a knocking detector) of the present disclosure. The ECU 2 according to the first exemplary embodiment corresponds to an augmenting control execution unit (a augmenting controller), a reduction unit (a reducer), a maintaining unit (a maintainer), and a predetermined time period setting unit.

As described above, according to the first exemplary embodiment, the EGR gas quantity QEGR and the port injection ratio RPI are increased at the same time (steps 47 and 48 illustrated in FIG. 5 and steps 61 and 62 illustrated in FIG. 6) by performing the augmenting control if the knocking of the engine 3 is detected (step 8 illustrated in FIG. 3: YES). Accordingly, the response lag of the EGR gas quantity QEGR can be compensated for by increasing the octane number of the fuel (hereinafter referred to as a "fuel octane number") supplied into the cylinder 3a. As a result, the knocking can be appropriately stopped in a short time. In addition, after the augmenting control is started, the port injection ratio RPI that was increased through the augmenting control is reduced (steps 27 and 28 illustrated in FIG. 4), and the EGR gas quantity QEGR is maintained at a value that can prevent the knocking of the engine 3 (steps 29 and 30). In this manner, the conditions that prevent knocking can be maintained and, in addition, the consumption of the ethanol E can be reduced.

In addition, the engine 3 is provided with the in-cylinder injection valve 6 that injects the gasoline G, which is the low octane number fuel, and the port injection valve 7 that injects the ethanol E, which is the high octane number fuel. Furthermore, since the fuel octane number is increased by increasing the port injection ratio RPI, the above-described effect, that is, the effect that appropriately prevents the knocking of the engine 3 in a short time can be effectively provided.

In addition, after the EGR delay time τEGR has elapsed since the beginning of the augmenting control, that is, after the EGR gas quantity QEGR has been increased through the augmenting control and becomes stable (step 25 illustrated in FIG. 4: YES), the port injection ratio RPI is reduced (step 27). Accordingly, an increase in the level of knocking caused by a decrease in the fuel octane number can be reliably prevented. In addition, the EGR delay time τEGR is set in accordance with the detected intake air quantity GAIR, intake pressure PBA, and EGR valve angular position θEGR (steps 44 and 45 illustrated in FIG. 5). Accordingly, the EGR delay time τEGR can be appropriately set to a period of time during which the EGR gas quantity QEGR increases through the augmenting control and becomes stable.

A control apparatus according to a second exemplary embodiment of the present disclosure is described below with reference to FIGS. 8 and 9. The difference between the control apparatus and the control apparatus 1 according to the first exemplary embodiment is briefly described first. As described above, according to the first exemplary embodiment, during the execution of the augmenting control, the port injection ratio RPI is maintained at the increased value until the EGR delay time τEGR has elapsed. In contrast, according to the second exemplary embodiment, during the execution of the augmenting control, it is supposed that the EGR gas quantity QEGR linearly increases after a certain period of time has elapsed, as indicated by a virtual EGR gas quantity QVIR represented by a dashed-two dotted line in FIG. 9. To reduce the consumption of the ethanol E while compensating for the response lag of the increasing EGR gas quantity QEGR, the port injection ratio RPI is increased temporarily and, thereafter, is gradually reduced before the EGR delay time τEGR elapses. As illustrated in FIG. 9, the virtual EGR gas quantity QVIR is considered as a value less than the actual EGR gas quantity QEGR. The difference between the control apparatus according to the second exemplary embodiment and the control apparatus according to the first exemplary embodiment is mainly described below.

Figure 8:
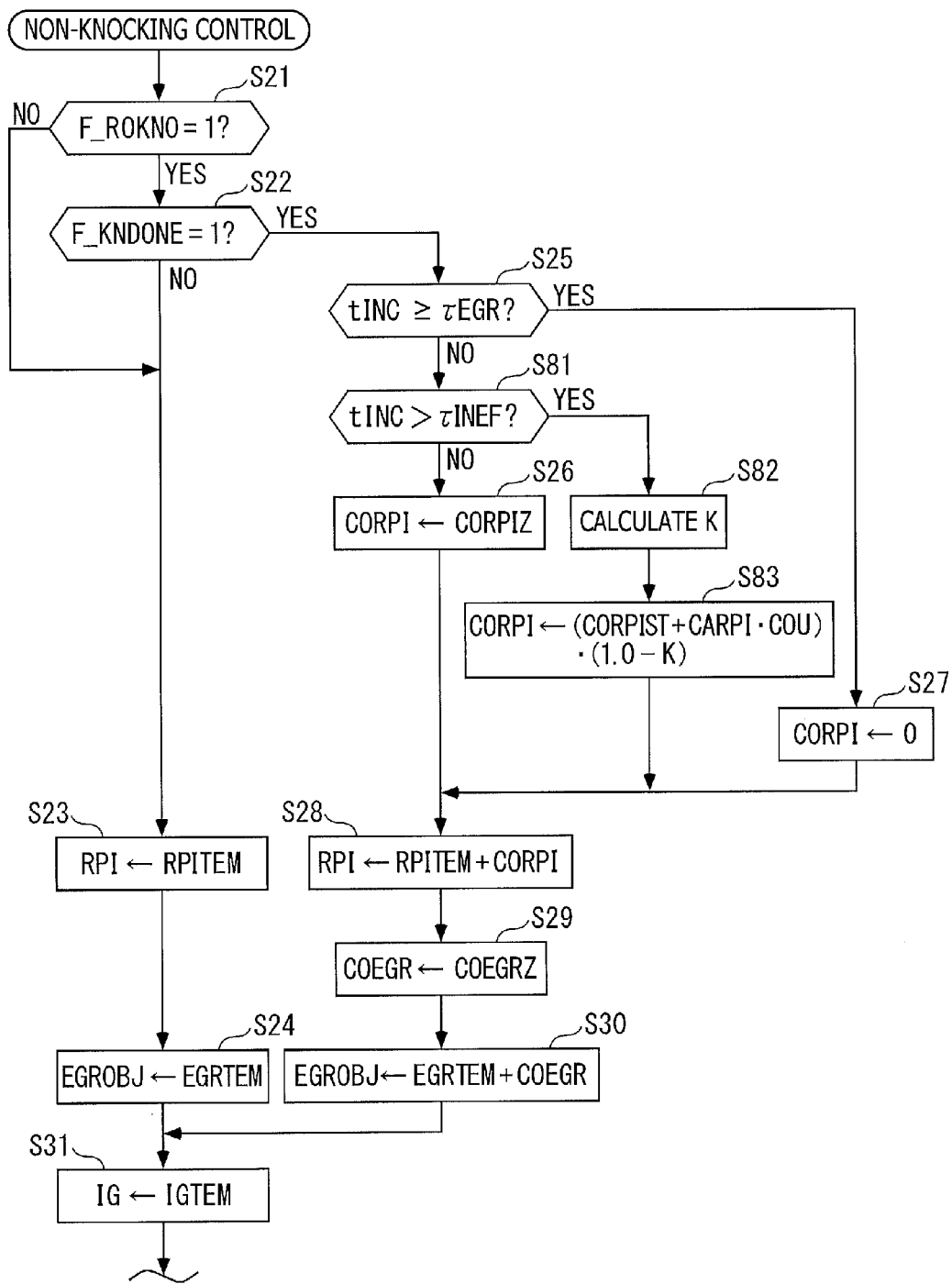
FIG. 8 is a flowchart of a non-knocking control process according to a second exemplary embodiment.
Figure 9:
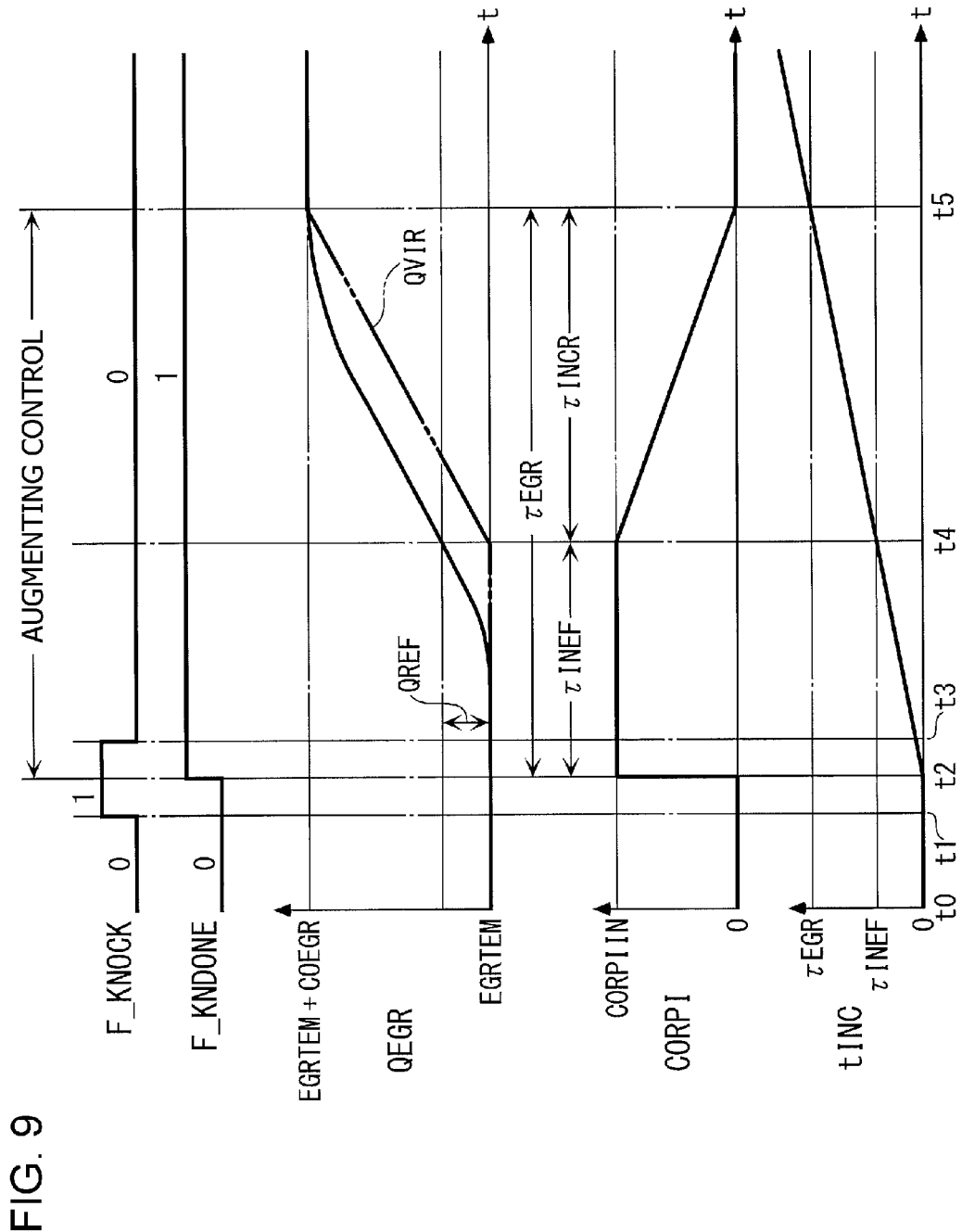
FIG. 9 is a timing diagram illustrating an example of the operation of an engine control process according to the second exemplary embodiment.

FIG. 8 illustrates a non-knocking control process according to the second exemplary embodiment. In FIG. 8, processes that are the same as those of the first exemplary embodiment are identified with the same step numbers. Note that in FIG. 8, the processes in step 31 and the subsequent steps are exactly the same as those of the first exemplary embodiment. Accordingly, for convenience of the description, the processes in step 32 and the subsequent steps are not illustrated.

As illustrated in FIG. 8, in the non-knocking control process according to the second exemplary embodiment, if the answer of step 25 is NO (tINC<τEGR) and, thus, the EGR delay time τEGR has not elapsed since the beginning of the augmenting control, it is determined whether the timer value tINC of the elapsed timer is greater than a predetermined EGR ineffective time τINEF (step 81).

The EGR ineffective time τINEF is preset to the time length from the beginning of the augmenting control to the time when the increment of the EGR gas quantity QEGR due to the augmenting control reaches a predetermined value QREF (refer to FIG. 9). The EGR ineffective time τINEF is shorter than the EGR delay time τEGR. That is, the EGR ineffective time τINEF is preset to a time length in which the increment of the EGR gas quantity QEGR is maintained at 0 under the condition that the EGR gas quantity QEGR increased through the augmenting control varies in the same manner as the above-described virtual EGR gas quantity QVIR. The predetermined value QREF is set to, for example, a value obtained by multiplying the initial correction term COEGRIN (refer to step 48) by a positive value less than 1.0.

If the answer of step 81 is NO (tINC≤τINEF) and, thus, the period of time elapsed from the beginning of the augmenting control is less than or equal to the EGR ineffective time τINEF, the processes in step 26 and the subsequent steps are performed. In this manner, the port injection ratio correction term CORPI is set to the previous value CORPIZ thereof (step 26), and the port injection ratio RPI is calculated by summing the tentative port injection ratio RPITEM and the port injection ratio correction term CORPI (step 28). In addition, the EGR gas correction term COEGR is set to the previous value COEGRZ thereof (step 29), and the target EGR gas quantity EGROBJ is calculated by summing the tentative EGR gas quantity EGRTEM and the EGR gas correction term COEGR (step 30).

However, if the answer of step 81 is YES (tINC>τINEF), that is, the period of time elapsed from the beginning of the augmenting control is greater than the EGR ineffective time τINEF and less than the EGR delay time τEGR, a coefficient K is calculated as follows (step 82):

$$K=(tINC-\tau INEF)(1/\tau INCR) \quad (1)$$

where τINCR represents an EGR increasing time, which is calculated by subtracting the EGR ineffective time τINEF from the EGR delay time τEGR. In this manner, the coefficient K is calculated as a positive value less than 1.0, and the coefficient K increases with increasing timer value tINC, that is, with increasing elapsed time from the beginning of the augmenting control.

Subsequently, the port injection ratio correction term CORPI is calculated using the calculated coefficient K as follows (step 83):

$$CORPI=(CORPIST+CARPI\cdot COU)(1.0-K) \quad (2)$$

where CORPIST represents a correction term used when the increase starts and is set to the port injection ratio correction term CORPI set when the count-up operation of the timer value tINC of the elapsed timer starts (steps 46 and 56 illustrated in FIG. 5), COU is a knock counter that represents the number of knocking events of the engine 3 detected within a period of time from the beginning of the augmenting control to the time when the EGR delay time τEGR elapses. Note that the additional term CARPI has already been described in the first exemplary embodiment. Thereafter, the processes in above-described step 28 and the subsequent steps are performed.

However, if the answer of step 25 is YES (tINC≥τEGR), that is, the EGR delay time τEGR has elapsed since the beginning of the augmenting control, the augmenting control is completed, as in the first exemplary embodiment, and the above-described processes in step 27 and the subsequent steps are performed. In this manner, the port injection ratio correction term CORPI is set to 0, and the port injection ratio RPI is set to the tentative port injection ratio RPITEM (step 28). In addition, the target EGR gas quantity EGROBJ is calculated by summing the tentative EGR gas quantity EGRTEM and the EGR gas correction term COEGR (step 30).

FIG. 9 illustrates an example of the operation of the engine control process according to the second exemplary embodiment. In the example of the operation in FIG. 9, knocking of the engine 3 stops immediately after the beginning of the augmenting control triggered by the knocking of the engine 3. In FIG. 9, the operation performed during a period of time from the time no knocking has occurred after the engine 3 is started to the time knocking occurs and the augmenting control begins (the time t0 to the time t2) is the same as that in the first exemplary embodiment.

After the augmenting control begins, the port injection ratio RPI and the EGR gas quantity QEGR are increased as in the first exemplary embodiment, and the timer value tINC of the elapsed timer is counted up. Thereafter, if the knocking of the engine 3 stops (at the time t3, F_KNOCK←0), the non-knocking control process is performed again. If, in the non-knocking control process, the timer value tINC of the elapsed timer is less than or equal to the EGR ineffective time τINEF (the time t3 to a time immediately before the time t4), the port injection ratio correction term CORPI and the EGR gas correction term COEGR are continuously maintained at the previous values CORPI and COEGR thereof, that is, the initial correction terms CORPIIN and COEGRIN, respectively, as in the first exemplary embodiment (steps 26 and 29 illustrated in FIG. 8).

In addition, when the knocking of the engine 3 stops and if the elapsed time from the beginning of the augmenting control is longer than τINEF (at the time t4, step 81 illustrated in FIG. 8: YES), the port injection ratio correction term CORPI is gradually decreased from that point in time (steps 82 and 83 illustrated in FIG. 8). Thus, the port injection ratio RPI, which is the sum of RPITEM and CORPI, is gradually reduced. In such a case, the knock counter COU in Equation (2) for calculating the port injection ratio correction term CORPI is 0. Accordingly, CORPI can be calculated by multiplying a value obtained by subtracting the coefficient K from 1.0 by the correction term CORPIST used when the increase starts. As can be seen from this description and Equation (1) for calculating the coefficient K, the port injection ratio correction term CORPI linearly decreases as the time passes for a period of time from the time the elapsed time from the beginning of the augmenting control reaches a value greater than the EGR ineffective time TINES to the time the elapsed time further increases and reaches the EGR delay time τEGR. In addition, the port injection ratio correction term CORPI gradually decreases so as to reach 0 when the elapsed time reaches the EGR delay time τEGR.

Thereafter, when the knocking of the engine 3 stops and if the EGR delay time τEGR has elapsed since the beginning of the augmenting control (at a time t5, step 25 illustrated in FIG. 8: YES), the augmenting control is completed, as in the first exemplary embodiment. Thereafter, the port injection ratio correction term CORPI is set to 0 (step 27). As a result, the port injection ratio RPI is set to the tentative port injection ratio RPITEM (step 28). In addition, as in the first exemplary embodiment, control is performed so that the target EGR gas quantity EGROBJ is maintained at the sum of the tentative EGR gas quantity EGRTEM and the EGR gas correction term COEGR (steps 29 and 30) and, thus, the EGR gas quantity QEGR is the sum of EGRTEM and COEGR.

In addition, although not illustrated in FIG. 9, the operation performed when the knocking of the engine 3 occurs again after the beginning of the augmenting control is the same as that in the first exemplary embodiment. That is, the port injection ratio correction term CORPI and the EGR gas correction term COEGR are calculated by adding the additional terms CARPI and CAEGR to the previous values CORPIZ and COEGRZ thereof, respectively (steps 52 and 53 illustrated in FIG. 5).

In addition, if knocking occurs again before the EGR delay time τEGR has elapsed since the beginning of the augmenting control (step 49 illustrated in FIG. 5: NO), the EGR delay time τEGR is calculated as a value obtained by adding the extended period of time τADD to the original value so as to match the EGR gas correction term COEGR increased in the above-described manner (step 51). However, if knocking is detected after the EGR delay time τEGR has elapsed (step 49: YES), the augmenting control is performed again. Thus, the EGR delay time τEGR is reset (steps 54 and 55), and a count-up operation of the timer value tINC of the elapsed timer is started from 0 again (step 56).

In addition, when the knocking of the engine 3 that occurred again stops and if the port injection ratio correction term CORPI is gradually decreased in steps 82 and 83, the port injection ratio correction term CORPI can be appropriately and gradually decreased while taking into account the additional term CARPI that has been added before, as can be seen from the addition of CARPI·COU in Equation (2).

As described above, according to the second exemplary embodiment, after the EGR ineffective time τINEF has elapsed since the beginning of the augmenting control (step 81 illustrated in FIG. 8: YES), that is, after the increment of the EGR gas quantity QEGR increasing due to the augmenting control reaches the predetermined value QREF (refer to FIG. 9), the port injection ratio RPI increased through the augmenting control is decreased and, in addition, the port injection ratio RPI is gradually decreased until the EGR delay time τEGR has elapsed (steps 82, 83, and 28). In this manner, the consumption of the ethanol E can be reduced more than in the first exemplary embodiment while preventing an increase in the level of the knocking of the engine 3 caused by a decrease in the fuel octane number (the octane number of the fuel supplied into the cylinder 3a).

In addition, the coefficient K can be calculated using Equation (1). That is, unlike a third exemplary embodiment described below, a k calculation map used to calculate a coefficient k is not needed. Accordingly, the control apparatus can be easily configured. Furthermore, the above-described effect described in the first exemplary embodiment can be provided in the same manner.

A control apparatus according to the third exemplary embodiment of the present disclosure is described below with reference to FIGS. 10 to 13. The difference between the control apparatus and the control apparatus 1 according to the first exemplary embodiment is briefly described first. As described above, according to the first exemplary embodiment, during the execution of the augmenting control, the port injection ratio RPI is maintained at the increased value until the EGR delay time τEGR has elapsed since the beginning of the augmenting control. In contrast, according to the third exemplary embodiment, during the execution of the augmenting control, to compensate for the response lag of the EGR gas quantity QEGR and reduce the consumption of the ethanol E, the port injection ratio RPI is temporarily increased and, thereafter, gradually decreased at a speed in accordance with the speed at which the EGR gas quantity QEGR increases. The difference between the control apparatus according to the third exemplary embodiment and those according to the first and second exemplary embodiments is mainly described below.

Figure 10:
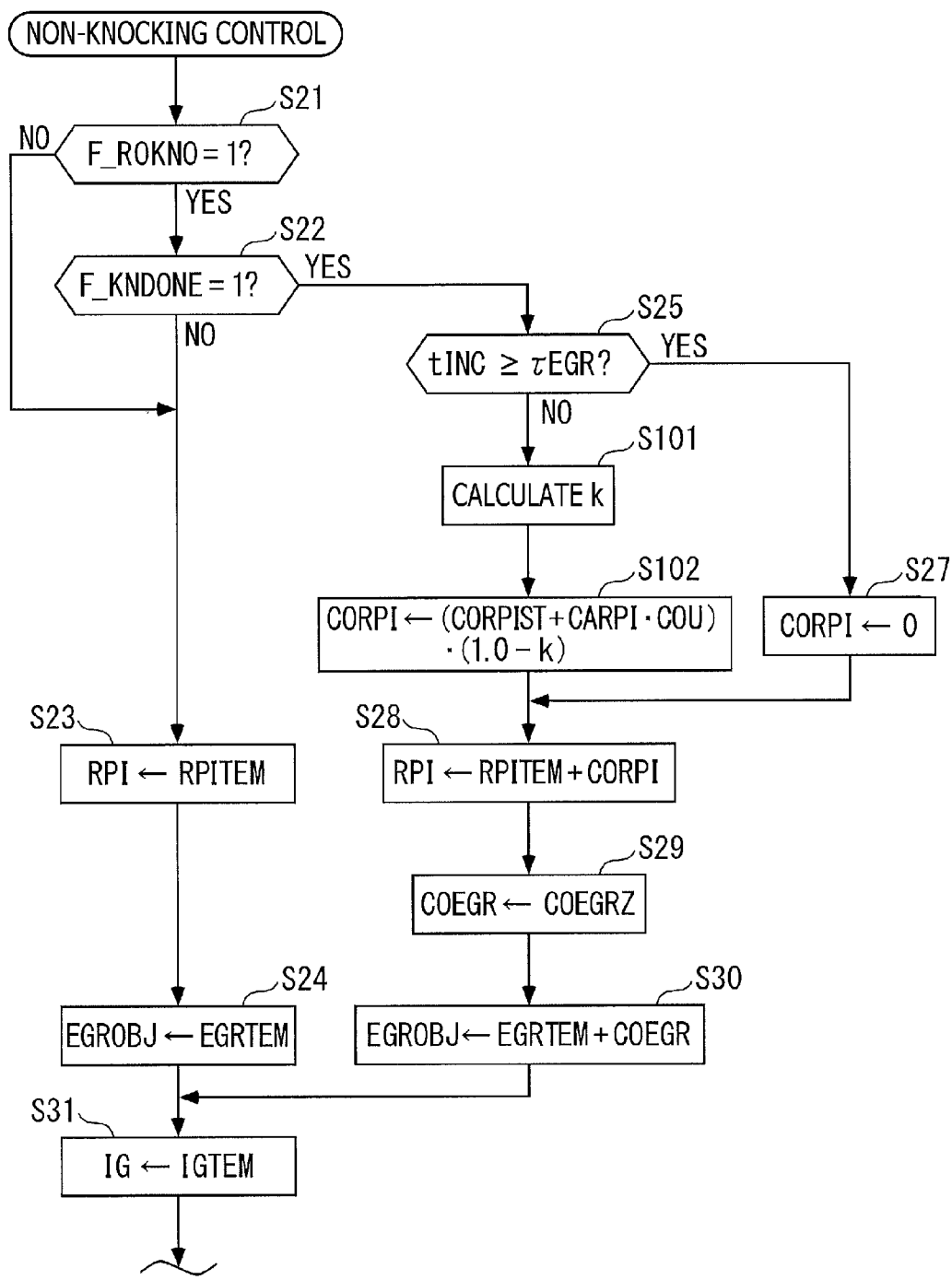
FIG. 10 is a flowchart of a non-knocking control process according to a third exemplary embodiment.

FIG. 10 illustrates a non-knocking control process according to the third exemplary embodiment. In FIG. 10, processes that are the same as those of the first exemplary embodiment are identified with the same step numbers. Note that in FIG. 10, the processes in step 31 and the subsequent steps are exactly the same as those of the first exemplary embodiment. Accordingly, for convenience of the description, the processes in step 32 and the subsequent steps are not illustrated.

Figure 11:
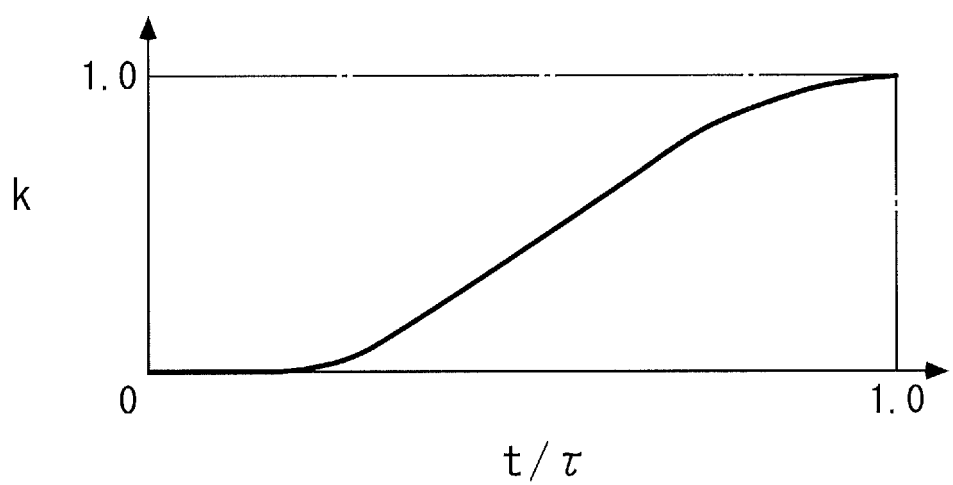
FIG. 11 illustrates an example of a k calculation map used in the non-knocking control process illustrated in FIG. 10.

As illustrated in FIG. 10, in the non-knocking control process according to the third exemplary embodiment, if the answer of step 25 is NO (tINC<τEGR) and, thus, the EGR delay time τEGR has not elapsed since the beginning of the augmenting control, the coefficient k is calculated (step 101). In such a case, the coefficient k is calculated by searching a k calculation map (the example is illustrated in FIG. 11) using the ratio of the timer value tINC of the elapsed timer to the EGR delay time τEGR (hereinafter referred to as an "elapsed time ratio t/τ").

The k calculation map is generated by obtaining, through experiments, the relationship between the elapsed time ratio t/τ and the ratio of the increment of the EGR gas quantity QEGR to the EGR gas correction term COEGR at any given point in time starting from the beginning of the count-up operation of the timer value tINC of the elapsed timer in the form of a map. The coefficient k corresponds to the ratio of the increment of the EGR gas quantity QEGR to the EGR gas correction term COEGR at any given point in time starting from the beginning of the augmenting control. As illustrated in FIG. 11, according to the k calculation map, the coefficient k is set to 0 in the range in which the elapsed time ratio t/τ is relatively low. In contrast, in the other range, the coefficient k is set to a higher value with increasing t/τ, where the value is a positive value lower than or equal to 1.0.

Note that like the first exemplary embodiment, when knocking is detected, the additional term CAEGR may be added to the EGR gas correction term COEGR (step 53 illustrated in FIG. 5). Accordingly, the following two maps are prepared: a map used when CAEGR is not added (COEGR=COEGRIN) and a map used when CAEGR is added.

In step 102 that follows the above-described step 101, the port injection ratio correction term CORPI is calculated using the calculated coefficient k as follows:

CORPI=(CORPIST+CARPI∩COU)(1.0−k)  (3).

Thereafter, the processes in step 28 and the subsequent steps are performed. Note that the correction term CORPIST used when the increase starts, the knock counter COU, the additional term CARPI in Equation (3) have been described in the first and second exemplary embodiments.

However, if the answer of step 25 is YES (tINC≥τEGR), the augmenting control is completed, as in the first and second exemplary embodiments. Thereafter, the processes in step 27 and the subsequent steps are performed. In this manner, the port injection ratio correction term CORPI is set to 0, and the port injection ratio RPI is set to the tentative port injection ratio RPITEM (step 28). In addition, the target EGR gas quantity EGROBJ is calculated by summing the tentative EGR gas quantity EGRTEM and the EGR gas correction term COEGR (step 30).

Figure 12:
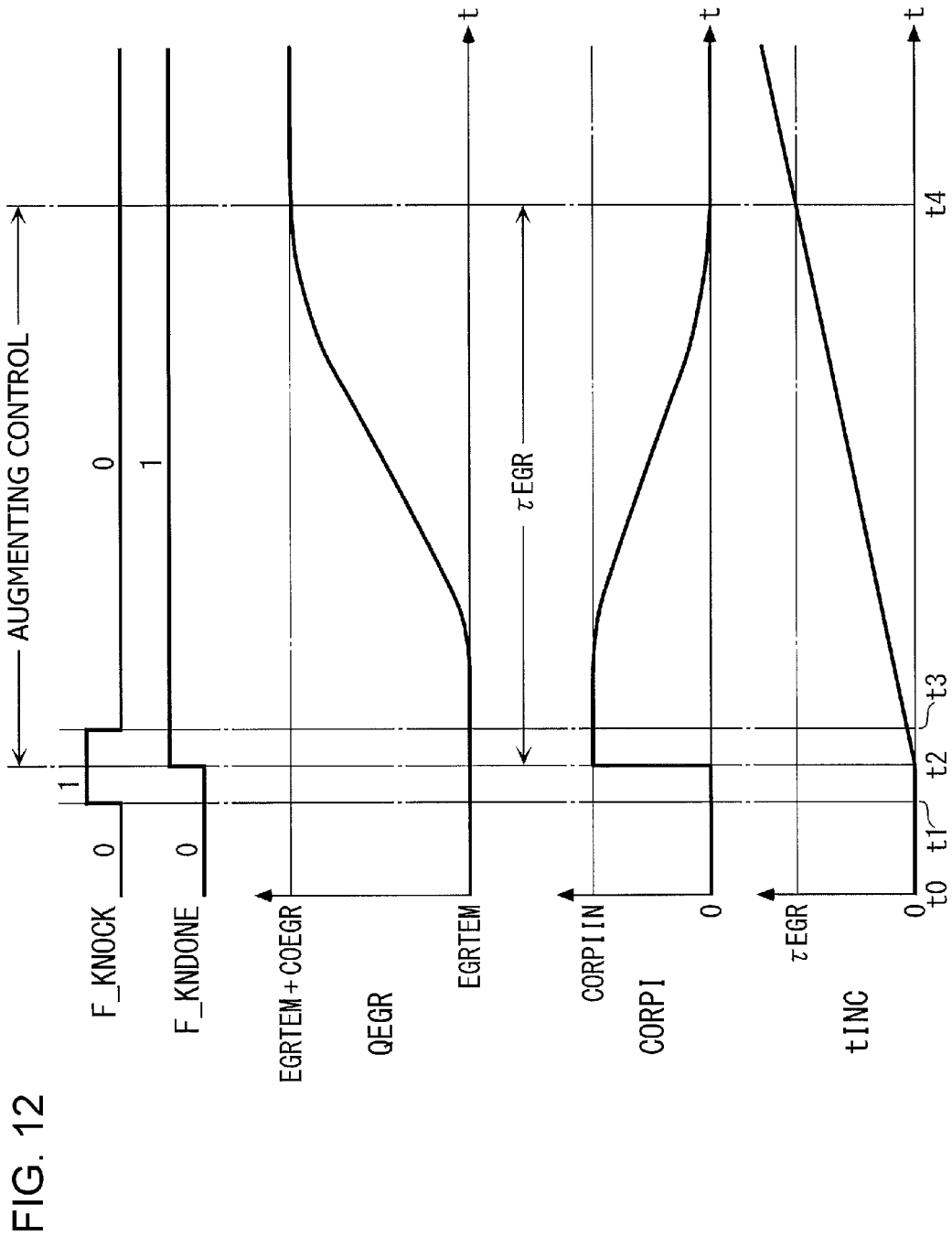
FIG. 12 is a timing diagram illustrating an example of the operation of an engine control process according to a third exemplary embodiment.

FIG. 12 illustrates an example of the operation of the engine control process according to the third exemplary embodiment. In the example of the operation in FIG. 12, knocking stops immediately after the beginning of the augmenting control triggered by the knocking of the engine 3. In FIG. 12, the operation performed during a period of time from the time no knocking has occurred after the engine 3 is started to the time knocking occurs and the augmenting control begins (the time t0 to the time t2) is the same as that in the first exemplary embodiment.

After the augmenting control begins, the port injection ratio RPI and the EGR gas quantity QEGR are increased as in the first exemplary embodiment, and the timer value tINC of the elapsed timer is counted up. Thereafter, if the knocking of the engine 3 stops (at the time t3, F_KNOCK←0), the non-knocking control process is performed again. If, in the non-knocking control process, the timer value tINC of the elapsed timer is less than the EGR delay time τEGR (the time t3 to a time immediately before the time t4), the port injection ratio correction term CORPI is gradually decreased (steps 101 and 102 illustrated in FIG. 10). Thus, the port injection ratio RPI, which is the sum of RPITEM and CORPI, is gradually decreased (step 28).

In such a case, since the knock counter COU is 0 in Equation (3) used to calculate the port injection ratio correction term CORPI, CORPI can be calculated by multiplying a value obtained by subtracting the coefficient k from 1.0 by the correction term CORPIST used when the increase starts. As described above, the coefficient k is calculated in accordance with the elapsed time ratio t/τ as the ratio of the increment of the EGR gas quantity QEGR to the EGR gas correction term COEGR at any given point in time starting from the beginning of the count-up operation of the timer value tINC of the elapsed timer. Thus, the port injection ratio correction term CORPI decreases at a speed in accordance with the speed at which the EGR gas quantity QEGR increases during a period of time from the beginning of the augmenting control to the time the EGR delay time τEGR elapses. In addition, the port injection ratio correction term CORPI is gradually decreased so as to reach 0 when the EGR delay time τEGR elapses.

Thereafter, when the knocking of the engine 3 stops and if the EGR delay time τEGR has elapsed since the beginning of the augmenting control (at a time t4, step 25 illustrated in FIG. 10: YES), the augmenting control is completed, as in the first exemplary embodiment. Thereafter, the port injection ratio correction term CORPI is set to 0 (step 27). As a result, the port injection ratio RPI is set to the tentative port injection ratio RPITEM (step 28). In addition, as in the first exemplary embodiment, control is performed so that the target EGR gas quantity EGROBJ is maintained at the sum of the tentative EGR gas quantity EGRTEM and the EGR gas correction term COEGR (steps 29 and 30) and, thus, the EGR gas quantity QEGR is the sum of EGRTEM and COEGR.

As described above, according to the third exemplary embodiment, the port injection ratio correction term CORPI is calculated so that the total sum of the increments of the EGR gas quantity QEGR and the increments (CORPI) of the port injection ratio RPI at any point in time in a time period from the beginning of the augmenting control to the time the EGR delay time τEGR elapses has a value that can prevent the knocking of the engine 3.

Figure 13:
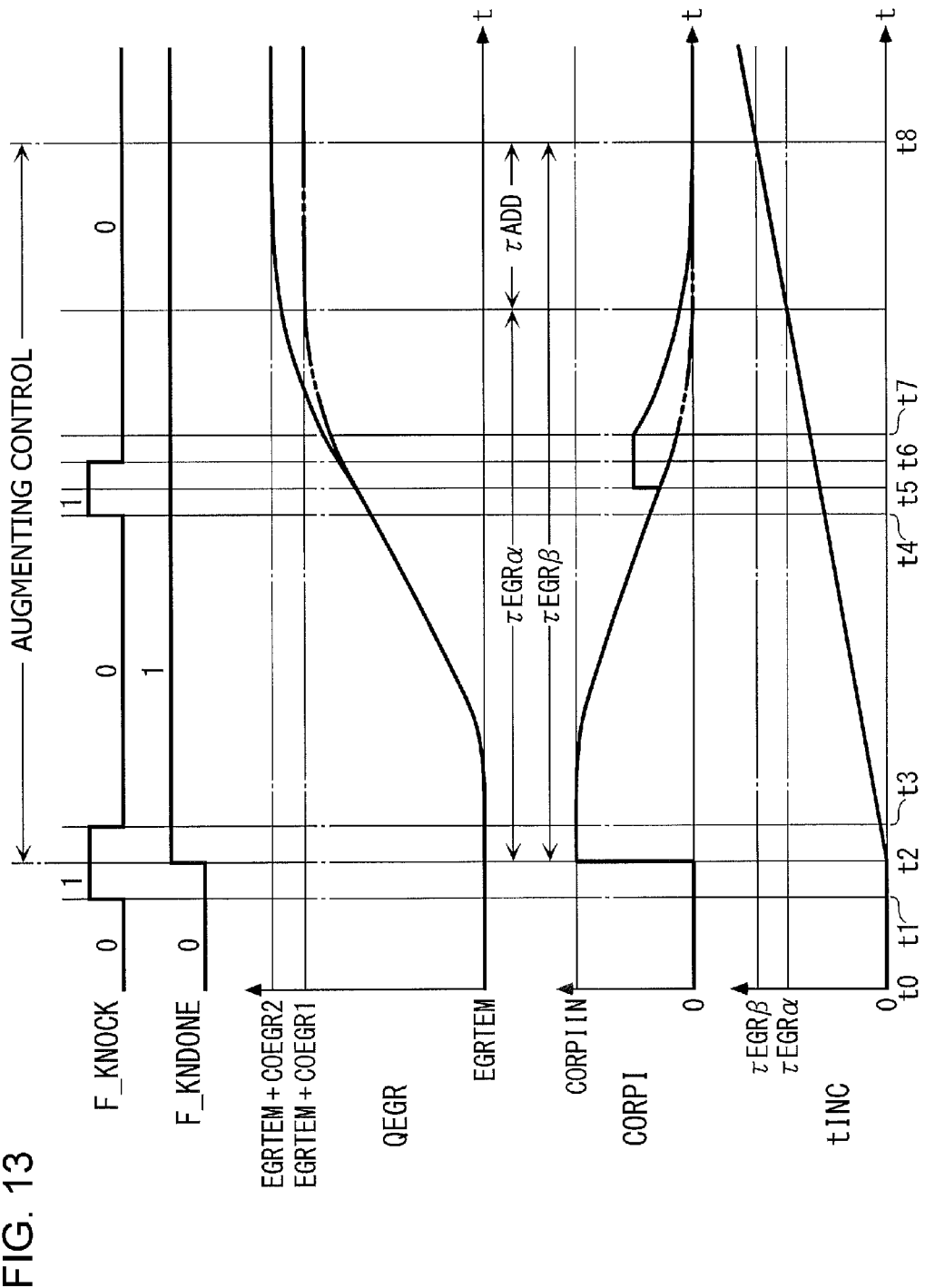
FIG. 13 is a timing diagram illustrating an operation that differs from the example operation of an engine control process according to the third exemplary embodiment in FIG. 12.

FIG. 13 illustrates an example of the operation that differs from the operation in FIG. 12. In the example of the operation, knocking of the engine 3 stops immediately after the beginning of the augmenting control triggered by the knocking of the engine 3. In addition, knocking occurs again before the EGR delay time τEGR elapses. In FIG. 13, an EGR gas correction term COEGR1 represents the EGR gas correction term COEGR set to the initial correction term COEGRIN used when the augmenting control begins. In addition, an EGR gas correction term COEGR2 represents the EGR gas correction term COEGR increased using the additional term CAEGR in connection with the recurrence of knocking (i.e., COEGR2=COEGR1+CAEGR).

In addition, in FIG. 13, the EGR delay time τEGRα represents the EGR delay time τEGR set when the augmenting control begins, and the EGR delay time τEGRβ represents the EGR delay time τEGR after the extended period of time τADD is added thereto when knocking occurs again (=τEGRα+τADD). Furthermore, a dashed-two dotted line for the EGR gas quantity QEGR indicates the variation of the EGR gas quantity QEGR on the assumption that the target EGR gas quantity EGROBJ is continuously set to EGRTEM+COEGR1. Still furthermore, a dashed-two dotted line for the port injection ratio correction term CORPI indicates the variation of the port injection ratio correction term CORPI on the assumption that the port injection ratio correction term CORPI is calculated using "CORPI=CORPIST(1.0−k)" without adding the additional term CARPI and is gradually decreased.

The operation performed until knocking of the engine 3 occurs (the operation performed until a time immediately before the time t4) is the same as the example of the operation illustrated in FIG. 12. If knocking occurs again (at the time t4, F_KNOCK=1), the knocking control process is started when the immediately subsequent engine control process is performed (at a time t5). In such a case, since the EGR delay time τEGR (=τEGRα) has not yet elapsed (step 49 illustrated in FIG. 5: NO), the extended period of time τADD is calculated (step 50), as in the first exemplary embodiment, and the calculated extended period of time τADD is added to the EGR delay time τEGR (step 51, τEGR=τEGRβ=τEGRα+τADD). In addition, the port injection ratio correction term CORPI and the EGR gas correction term COEGR are calculated by adding the additional terms CARPI and CAEGR to the previous values CORPIZ and COEGRZ thereof, respectively (steps 52 and 53 illustrated in FIG. 5). In this manner, the EGR gas quantity QEGR and the port injection ratio RPI are increased.

Thereafter, if the knocking of the engine 3 stops (at a time t6, F_KNOCK=0), the non-knocking control process is resumed at the time the immediate subsequent engine control process is performed (at a time t7). In such a case, since the EGR delay time τEGR (=τEGRβ) has not elapsed (step 25 illustrated in FIG. 10: NO), the coefficient k is calculated in accordance with the elapsed time ratio t/τ (step 101). In addition, the port injection ratio correction term CORPI is calculated by multiplying a value obtained by adding COU (=1)·CARPI to CORPIST by (1.0−k) using the above-described Equation (3) (step 102). Thus, the port injection ratio correction term CORPI is gradually decreased again.

Thereafter, when the knocking of the engine 3 is stopped and if the EGR delay time τEGR (=τEGRβ) elapses (at a time t8, step 25 illustrated in FIG. 10: YES), the subsequent operation is the same as the above-described example of the operation illustrated in FIG. 12. That is, the EGR gas quantity QEGR converges to the target EGR gas quantity EGROBJ (=EGRTEM+COEGR2) and remains at this value. In addition, the port injection ratio correction term CORPI is set to 0.

As described above, according to the third exemplary embodiment, the port injection ratio RPI is decreased after the next engine control is performed after the beginning of the augmenting control at the latest (steps 101, 102, and 28 illustrated in FIG. 10). In this manner, after the fuel octane number (the octane number of the fuel supplied into the cylinder 3a) increases through the augmenting control and becomes stable, the fuel octane number is decreased. In such a case, the port injection ratio RPI is gradually decreased at a speed in accordance with the speed at which the EGR gas quantity QEGR increases through the augmenting control (steps 101 and 102 illustrated in FIG. 10). In this manner, the fuel octane number can be gradually decreased so as to match the increasing EGR gas quantity QEGR. Accordingly, an increase in the level of the knocking of the engine 3 caused by the decrease in the fuel octane number can be prevented, and an increase in the consumption of the ethanol E can be prevented in an appropriate manner at the same time. As a result, the consumption of the ethanol E can be reduced more than in the first and second exemplary embodiments. In addition, the effect of the first exemplary embodiment can be provided in the same manner.

Note that according to the third exemplary embodiment, the port injection ratio RPI is gradually decreased using the above-described technique using the coefficient k. However, the port injection ratio RPI may be gradually decreased using another appropriate technique (e.g., a technique described below) if the port injection ratio RPI is gradually decreased at a speed in accordance with the speed at which the EGR gas quantity QEGR increases through the augmenting control. That is, a relationship between the elapsed time ratio t/τ and the ratio of the increase speed of the EGR gas quantity at any given time, that is, the ratio of the increment per unit time to the EGR gas correction term COEGR (hereinafter referred to as an "EGR gas increase ratio") is obtained in the form of a map, and the map is stored in the ROM in advance. By searching the map using the elapsed time ratio t/τ, the EGR gas increase ratio at any given time is calculated. Subsequently, by subtracting a value obtained by multiplying the calculated EGR gas increase ratio by the correction term CORPIST used when the increase starts from the previous value CORPIZ of the port injection ratio correction term, the current port injection ratio correction term CORPI is calculated. By using the port injection ratio correction term CORPI calculated in this manner, the port injection ratio RPI can be gradually decreased at a speed in accordance with the speed at which the EGR gas quantity QEGR increases through the augmenting control.

Note that the present disclosure is not limited to the above-described first to third exemplary embodiments (hereinafter correctively referred to as the "embodiment") and can be practiced in various forms. For example, while the embodiment has been described with reference to the in-cylinder injection valve 6 that injects the gasoline G serving as the low octane number fuel and the port injection valve 7 that injects the ethanol E serving as the high octane number fuel, the injection valves may be reversed. That is, the port injection valve 7 may inject the gasoline G, and the in-cylinder injection valve 6 may inject the ethanol E. In addition, while the embodiment of the present disclosure has been described with reference to the engine 3 including the in-cylinder injection valve 6 and the port injection valve 7, the present disclosure is not limited thereto. For example, the present disclosure can be applied to the following type of internal-combustion engine. That is, a fuel injection valve is provided in each of the cylinders, and the fuel octane number can be changed by changing the angular position of an electromagnetic valve disposed in a pipe that connects the fuel injection valve to a first tank for reserving the low octane number fuel and a second tank for reserving the high octane number fuel.

In addition, while the embodiment of the present disclosure has been described with reference to the engine 3 that generates the ethanol E serving as the high octane number fuel by separating the ethanol component from the gasoline G serving as the low octane number fuel using the separation apparatus 23, the present disclosure is applicable to internal-combustion engines that include no separation apparatus and that receive both low octane number fuel and high octane number fuel supplied from the outside. In addition, while the embodiment has been described with reference to detection of the knocking of the engine 3 using the detection signal of the knock sensor 32, the knocking of the engine 3 may be detected on the basis of a detection signal of a sensor that detects the pressure in a cylinder.

Furthermore, while the embodiment of the present disclosure has been described with reference to the EGR delay time τEGR calculated using the intake air quantity GAIR, the intake pressure PBA, and the EGR valve angular position θEGR, the EGR delay time τEGR may be calculated using any one or two of the intake air quantity GAIR, the intake pressure PBA, and the EGR valve angular position θEGR. In addition, while the embodiment of the present disclosure has been described with reference to the EGR delay time τEGR calculated in accordance with the EGR valve angular position θEGR, the EGR delay time τEGR may be calculated in accordance with the deviation between a target EGR gas quantity calculated immediately before the beginning of the augmenting control and a target EGR gas quantity calculated at the beginning of the augmenting control or another appropriate parameter indicating the deviation (e.g., an EGR gas correction term calculated at the beginning of the augmenting control). Still furthermore, the detailed configuration can be modified as needed within the scope and the spirit of the present disclosure.

According to a first aspect of the disclosure, a method for controlling an internal-combustion engine 3 is provided. The internal-combustion engine 3 includes an EGR system 10 capable of recirculating part of exhaust gas into an intake passage 4 as EGR gas and changing the EGR gas quantity QEGR supplied to a cylinder 3a. The internal-combustion engine 3 is capable of changing a fuel octane number representing an octane number of fuel supplied into the cylinder 3a. The method includes a first step of detecting knocking of the internal-combustion engine 3 (step 8 in FIG. 3 of the embodiment (the same applies in this section)), a second step of performing augmenting control that increases the EGR gas quantity QEGR via the EGR system 10 and increases the fuel octane number (step 10 in FIG. 3, steps 47 and 48 in FIG. 5, and steps 61 and 62 in FIG. 6) if knocking of the internal-combustion engine 3 is detected in the first step (step 8: YES), a third step of decreasing the fuel octane number increased through the augmenting control after the augmenting control begins (steps 27 and 28 in FIG. 4, steps 82, 83, and 27, and 28 in FIG. 8, and steps 101, 102, 27, and 28 in FIG. 10), and a fourth step of maintaining the EGR gas quantity QEGR at a level capable of preventing the knocking of the internal-combustion engine 3 via the EGR system 10 after the augmenting control is performed (steps 29 and 30 in each of FIGS. 4, 8, and 10).

According to such a configuration, the internal-combustion engine includes the EGR system capable of recirculating part of exhaust gas into an intake passage as EGR gas and changing the EGR gas quantity supplied to a cylinder. In addition, the internal-combustion engine is capable of changing a fuel octane number representing an octane number of fuel supplied into the cylinder. The EGR system is used to recirculate part of the exhaust gas into the intake passage as the EGR gas. Accordingly, when a change in the EGR gas quantity supplied into the cylinder via the EGR system is attempted, a relatively long delay time is needed until the EGR gas quantity actually changes. That is, the responsiveness of the EGR gas quantity is low. In contrast, in general, the fuel octane number is changed by adjusting the ratio of each of the amount of the low octane number fuel having a relatively low octane number and the amount of the high octane number fuel having a relatively high octane number to the amount of the fuel supplied into the cylinder. Accordingly, the responsiveness of the fuel octane number is higher than that of the EGR gas quantity.

According to the present disclosure, if knocking of the internal-combustion engine is detected in the first step, the augmenting control in the second step is performed. In this manner, the EGR gas quantity and the fuel octane number are increased using the EGR system at the same time. Accordingly, the response lag of the EGR gas quantity can be compensated for by increasing the fuel octane number. As a result, the knocking can be appropriately prevented in a short time.

In addition, after the augmenting control is performed, the fuel octane number that was increased through the augmenting control is decreased in the third step, and the EGR gas quantity is maintained at a level that can prevent the knocking of the engine in the fourth step. In this manner, the conditions that prevent knocking can be maintained and, in addition, the consumption of the high octane number fuel can be reduced.

According to a second aspect of the present disclosure, in the method for controlling the internal-combustion engine 3 according to the first aspect, the fuel supplied into the cylinders 3a is formed from low octane number fuel (gasoline G) and high octane number fuel (ethanol E) having an octane number higher than that of the low octane number fuel. The internal-combustion engine 3 further includes a first injection device (an in-cylinder injection valve 6) that injects the low octane number fuel and a second injection device (a port injection valve 7) that injects the high octane number fuel. An increase in the fuel octane number by the augmenting control and a decrease in the fuel octane number in the third step are performed by adjusting the ratio of an amount of the low octane number fuel to a total amount of the low octane number fuel and the high octane number fuel supplied into the cylinder 3a and the ratio of an amount of the high octane number fuel to the total amount (a port injection ratio RPI).

According to such a configuration, the internal-combustion engine includes the first injection device that injects the low octane number fuel and the second injection device that injects the high octane number fuel. In addition, an increase in the fuel octane number by the augmenting control and a decrease in the fuel octane number in the third step are performed by adjusting the ratio of an amount of the low octane number fuel to a total amount of the low octane number fuel and the high octane number fuel supplied into the cylinder and the ratio of an amount of the high octane number fuel to the total amount. Accordingly, the effect of the first aspect of the disclosure, that is, the effect that prevents knocking early and appropriately can be effectively provided.

According to a third aspect of the disclosure, in the third step of the method for controlling the internal-combustion engine 3 according to the first or second aspect, the decrease in the fuel octane number is started (steps 27 and 28 illustrated in FIG. 4, steps 82, 83, and 28 illustrated in FIG. 8, and steps 101, 102, and 28 illustrated in FIG. 10) when a predetermined period of time (an EGR delay time τEGR or an EGR ineffective time τINEF) has elapsed since the beginning of the augmenting control (step 25 illustrated in FIG. 4: YES, or step 81 illustrated in FIG. 8: YES).

According to such a configuration, the decrease in the fuel octane number in the third step is started when the predetermined period of time has elapsed since the beginning of the augmenting control. In this manner, after the EGR gas quantity supplied to the cylinder is actually increased through the augmenting control, the fuel octane number can be decreased. Accordingly, an increase in the level (the intensity) of the knocking caused by the decrease in the fuel octane number can be prevented.

According to a fourth aspect of the present disclosure, in the method for controlling the internal-combustion engine 3 according to the third aspect, the predetermined period of time (the EGR delay time τEGR) is a period of time between a time when the augmenting control begins and a time when the EGR gas quantity QEGR increases through the augmenting control and becomes stable.

According to such a configuration, the fuel octane number can be decreased after the EGR gas quantity supplied into the cylinder increases through the augmenting control and becomes stable. Accordingly, an increase in the level of the knocking due to a decrease in the fuel octane number can be reliably prevented.

According to a fifth aspect of the present disclosure, in the method for controlling the internal-combustion engine 3 according to the fourth aspect, the EGR system 10 includes an EGR control valve 12 for changing the EGR gas quantity QEGR, and the method further includes a fifth step of detecting at least one of an intake air quantity of the internal-combustion engine 3, a pressure in the intake passage 4, and an angular position of the EGR control valve 12 and a sixth step of setting the predetermined period of time on the basis of the at least one of detected intake air quantity GAIR of the internal-combustion engine 3, pressure PBA in the intake passage 4, and angular position θEGR of the EGR control valve 12 (steps 44 and 45 illustrated in FIG. 5).

According to such a configuration, in the fifth step, at least one of the intake air quantity of the internal-combustion engine, the pressure in the intake passage, and the angular position of the EGR control valve is detected. In addition, in the sixth step, the predetermined period of time is set on the basis of the at least one of detected intake air quantity of the internal-combustion engine, pressure in the intake passage, and angular position of the EGR control valve. These parameters have a close relationship with a delay time between the time when the EGR gas quantity starts changing via the EGR system and the time the EGR gas quantity actually changes and becomes stable. Accordingly, the predetermined period of time can be appropriately set to the period of time needed until the EGR gas quantity increases through the augmenting control and then becomes stable in accordance with at least one of the parameters.

According to a sixth aspect of the present disclosure, in the method for controlling the internal-combustion engine 3 according to the third aspect, the predetermined period of time (an EGR ineffective time τINEF) is a period of time between a time when the augmenting control begins and a time when an increment of the EGR gas quantity QEGR increasing through the augmenting control reaches a predetermined value QREF. In the third step, the fuel octane number is gradually decreased until the EGR gas quantity QEGR increases through the augmenting control and becomes stable (steps 82, 83, and 28 illustrated in FIG. 8).

According to such a configuration, the fuel octane number is decreased after the increment of the EGR gas quantity increasing through the augmenting control reaches a predetermined value. In addition, the fuel octane number is gradually decreased until the EGR gas quantity increases through the augmenting control and becomes stable. In this manner, an increase in the level of knocking caused by a decrease in the fuel octane number can be prevented and, in addition, the consumption of the high octane number fuel can be decreased more than that in the fourth aspect of the present disclosure.

According to a seventh aspect of the present disclosure, in the method for controlling the internal-combustion engine 3 according to the third aspect, the predetermined period of time is a period of time between a time when the augmenting control begins and a time when the fuel octane number increases through the augmenting control and becomes stable. In the third step, the fuel octane number is gradually decreased at a speed in accordance with a speed at which the EGR gas quantity QEGR increases through the augmenting control (steps 101, 102, and 28 illustrated in FIG. 10).

According to such a configuration, the fuel octane number is decreased after the fuel octane number increases through the augmenting control and becomes stable. The fuel octane number is gradually decreased at a speed (a decrement per unit time) in accordance with a speed at which the EGR gas quantity increases through the augmenting control (an increment per unit time). In this manner, the fuel octane number can be gradually decreased so as to match the increasing EGR gas quantity. Accordingly, an increase in the level of knocking caused by a decrease in the fuel octane number can be prevented and, in addition, the consumption of the high octane number fuel can be decreased at the same time. As a result, the consumption of the high octane number fuel can be reduced more than that in the fourth and sixth aspects of the present disclosure.

According to an eighth aspect of the present disclosure, a control apparatus 1 for controlling an internal-combustion engine 3 is provided. The internal-combustion engine 3 includes an EGR system 10 capable of recirculating part of exhaust gas into an intake passage 4 as EGR gas and changing an EGR gas quantity QEGR supplied to a cylinder 3a. The internal-combustion engine 3 is capable of changing a fuel octane number representing an octane number of fuel supplied into the cylinder 3a. The control apparatus 1 includes a knocking detection unit (a knock sensor 32 and an ECU 2 and step 8 illustrated in FIG. 3 according to exemplary embodiments, and the same applies to the section) that detects knocking of the internal-combustion engine 3, an augmenting control execution unit (the ECU 2, step 10 illustrated in FIG. 3, steps 47 and 48 illustrated in FIG. 5, and steps 61 and 62 illustrated in FIG. 6) that performs augmenting control to increase the EGR gas quantity QEGR via the EGR system 10 and increase the fuel octane number if knocking of the internal-combustion engine 3 is detected (step 8: YES), a reduction unit (the ECU 2, steps 27 and 28 illustrated in FIG. 4, steps 82, 83, 27 and 28 illustrated in FIG. 8, and steps 101, 102, 27, and 28 illustrated in FIG. 10) that decreases the fuel octane number increased through the augmenting control after the augmenting control begins, and a maintaining unit (the ECU 2 and steps 29 and 30 illustrated in FIGS. 4, 8, and 10) that maintains the EGR gas quantity QEGR at a level capable of preventing the knocking of the internal-combustion engine 3 via the EGR system 10 after the augmenting control is performed.

As can be clearly seen from the above-described configuration, this aspect is obtained by rewriting the method for controlling an internal-combustion engine according to the first aspect of the disclosure in the form of the apparatus for controlling an internal-combustion engine. Accordingly, an effect that is the same as the above-described effect of the first aspect of the present disclosure can be provided.

According to a ninth aspect of the present disclosure, in the control apparatus 1 for controlling the internal-combustion engine 3 according to the eighth aspect, the fuel supplied into the cylinder 3a is formed from low octane number fuel (the gasoline G) and high octane number fuel (the ethanol E) having an octane number higher than the low octane number fuel. The internal-combustion engine 3 further includes a first injection device (the in-cylinder injection valve 6) that injects the low octane number fuel and a second injection device (the port injection valve 7) that injects the high octane number fuel. An increase in the fuel octane number by the augmenting control and a decrease in the fuel octane number by the reduction unit are performed by adjusting the ratio of an amount of the low octane number fuel to a total amount of the low octane number fuel and the high octane number fuel supplied into the cylinder 3a and the ratio of an amount of the high octane number fuel to the total amount (the port injection ratio RPI).

As can be clearly seen from the above-described configuration, this aspect is obtained by rewriting the method for controlling the internal-combustion engine according to the second aspect of the disclosure in the form of the apparatus for controlling the internal-combustion engine. Accordingly, an effect that is the same as the above-described effect of the second aspect of the present disclosure can be provided.

According to a tenth aspect of the present disclosure, in the control apparatus 1 for controlling the internal-combustion engine 3 according to the eighth or ninth aspect, the reduction unit starts decreasing the fuel octane number (steps 27 and 28 illustrated in FIG. 4, steps 82, 83, and 28 illustrated in FIG. 8, and steps 101, 102, and 28 illustrated in FIG. 10) when a predetermined period of time (the EGR delay time $\tau$EGR, the EGR ineffective time $\tau$INEF) has elapsed since the beginning of the augmenting control (step 25 illustrated in FIG. 4: YES, step 81 illustrated in FIG. 8: YES).

As can be clearly seen from the above-described configuration, this aspect is obtained by rewriting the method for controlling the internal-combustion engine according to the third aspect of the disclosure in the form of the apparatus for controlling the internal-combustion engine. Accordingly, an effect that is the same as the above-described effect of the third aspect of the present disclosure can be provided.

According to an eleventh aspect of the present disclosure, in the control apparatus 1 for controlling the internal-combustion engine 3 according to the tenth aspect, the predetermined period of time (the EGR delay time $\tau$EGR) is a period of time between a time when the augmenting control begins and a time when the EGR gas quantity QEGR increases through the augmenting control and becomes stable.

As can be clearly seen from the above-described configuration, this aspect is obtained by rewriting the method for controlling the internal-combustion engine according to the fourth aspect of the disclosure in the form of the apparatus for controlling the internal-combustion engine. Accordingly, an effect that is the same as the above-described effect of the fourth aspect of the present disclosure can be provided.

According to a twelfth aspect of the present disclosure, in the control apparatus 1 for controlling the internal-combustion engine 3 according to the eleventh aspect, the EGR system 10 includes an EGR control valve 12 for changing the EGR gas quantity QEGR. The control apparatus 1 further includes a parameter detection unit (the intake air quantity sensor 34, the intake air pressure sensor 35, and the EGR valve angular position sensor 41) that detects at least one of an intake air quantity of the internal-combustion engine 3, a pressure in the intake passage 4, and an angular position of the EGR control valve 12, and a predetermined time period setting unit (the ECU 2 and steps 44 and 45 illustrated in FIG. 5) that sets the predetermined period of time on the basis of at least one of the detected intake air quantity GAIR of the internal-combustion engine 3, pressure PBA in the intake passage 4, and angular position $\theta$EGR of the EGR control valve 12.

As can be clearly seen from the above-described configuration, this aspect is obtained by rewriting the method for controlling the internal-combustion engine according to the fifth aspect of the disclosure in the form of the apparatus for controlling the internal-combustion engine. Accordingly, an effect that is the same as the above-described effect of the fifth aspect of the present disclosure can be provided.

According to a thirteenth aspect of the present disclosure, in the control apparatus 1 for controlling the internal-combustion engine 3 according to the tenth aspect, the predetermined period of time (the EGR ineffective time $\tau$INEF) is a period of time between a time when the augmenting control begins and a time when an increment of the EGR gas quantity QEGR increasing through the augmenting control reaches a predetermined value QREF, Rand the reduction unit gradually decreases the fuel octane number until the EGR gas quantity QEGR increases through the augmenting control and becomes stable (steps 82, 83, and 28 illustrated in FIG. 8).

As can be clearly seen from the above-described configuration, this aspect is obtained by rewriting the method for controlling the internal-combustion engine according to the sixth aspect of the disclosure in the form of the apparatus for controlling the internal-combustion engine. Accordingly, an effect that is the same as the above-described effect of the sixth aspect of the present disclosure can be provided.

According to a fourteenth aspect of the present disclosure, in the control apparatus 1 for controlling the internal-combustion engine 3 according to the tenth aspect, the predetermined period of time is a period of time between a time when the augmenting control begins and a time when the fuel octane number increases through the augmenting control and becomes stable, and the reduction unit gradually decreases the fuel octane number at a speed in accordance with a speed at which the EGR gas quantity QEGR increases through the augmenting control (steps 101, 102, and 28 illustrated in FIG. 10).

As can be clearly seen from the above-described configuration, this aspect is obtained by rewriting the method for controlling the internal-combustion engine according to the seventh aspect of the disclosure in the form of the apparatus for controlling the internal-combustion engine. Accordingly, an effect that is the same as the above-described effect of the seventh aspect of the present disclosure can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling an internal-combustion engine, the internal-combustion engine including an EGR system capable of recirculating part of exhaust gas into an intake passage as EGR gas and changing an EGR gas quantity supplied to a cylinder, the internal-combustion engine capable of changing a fuel octane number representing an octane number of fuel supplied into the cylinder, the method comprising:
    a first step of detecting knocking of the internal-combustion engine;
    a second step of performing augmenting control that increases the EGR gas quantity via the EGR system and increases the fuel octane number if knocking of the internal-combustion engine is detected in the first step;
    a third step of decreasing the fuel octane number increased through the augmenting control after the augmenting control begins; and
    a fourth step of maintaining the EGR gas quantity at a level capable of preventing the knocking of the internal-combustion engine via the EGR system after the augmenting control is performed.

2. The method according to claim 1, wherein the fuel supplied into the cylinder is formed from low octane number fuel and high octane number fuel having an octane number higher than the low octane number fuel,
    wherein the internal-combustion engine further includes a first injection device that injects the low octane number fuel and a second injection device that injects the high octane number fuel, and
    wherein an increase in the fuel octane number by the augmenting control and a decrease in the fuel octane number in the third step are performed by adjusting a ratio of an amount of the low octane number fuel to a total amount of the low octane number fuel and the high octane number fuel supplied into the cylinder and a ratio of an amount of the high octane number fuel to the total amount.

3. The method according to claim 1, wherein, in the third step, the decrease in the fuel octane number is started when a predetermined period of time has elapsed since the beginning of the augmenting control.

4. The method according to claim 3, wherein the predetermined period of time is a period of time between a time when the augmenting control begins and a time when the EGR gas quantity increases through the augmenting control and becomes stable.

5. The method according to claim 4, wherein the EGR system includes an EGR control valve for changing the EGR gas quantity,
    wherein the method further comprises:
    a fifth step of detecting at least one of an intake air quantity, a pressure in the intake passage, and an angular position of the EGR control valve of the internal-combustion engine; and
    a sixth step of setting the predetermined period of time on the basis of the at least one of the detected intake air quantity of the internal-combustion engine, pressure in the intake passage, and angular position of the EGR control valve.

6. The method according to claim 3, wherein the predetermined period of time is a period of time between a time when the augmenting control begins and a time when an increment of the EGR gas quantity increasing through the augmenting control reaches a predetermined value, and
    wherein in the third step, the fuel octane number is gradually decreased until the EGR gas quantity increases through the augmenting control and becomes stable.

7. The method according to claim 3, wherein the predetermined period of time is a period of time between a time when the augmenting control begins and a time when the fuel octane number increases through the augmenting control and becomes stable, and
    wherein in the third step, the fuel octane number is gradually decreased at a speed in accordance with a speed at which the EGR gas quantity increases through the augmenting control.

8. An apparatus for controlling an internal-combustion engine, the internal-combustion engine including an EGR system capable of recirculating part of exhaust gas into an intake passage as EGR gas and changing an EGR gas quantity supplied to a cylinder, the internal-combustion engine capable of changing a fuel octane number representing an octane number of fuel supplied into the cylinder, the apparatus comprising:
    a knocking detection unit that detects knocking of the internal-combustion engine;
    an augmenting control execution unit that performs augmenting control to increase the EGR gas quantity via the EGR system and increase the fuel octane number if knocking of the internal-combustion engine is detected;
    a reduction unit that decreases the fuel octane number increased through the augmenting control after the augmenting control begins; and
    a maintaining unit that maintains the EGR gas quantity at a level capable of preventing the knocking of the internal-combustion engine via the EGR system after the augmenting control is performed.

9. The apparatus according to claim 8, wherein the fuel supplied into the cylinder is formed from low octane number fuel and high octane number fuel having an octane number higher than the low octane number fuel,
wherein the internal-combustion engine further includes a first injection device that injects the low octane number fuel and a second injection device that injects the high octane number fuel, and
wherein an increase in the fuel octane number by the augmenting control and a decrease in the fuel octane number by the reduction unit are performed by adjusting a ratio of an amount of the low octane number fuel to a total amount of the low octane number fuel and the high octane number fuel supplied into the cylinder and a ratio of an amount of the high octane number fuel to the total amount.

10. The apparatus according to claim 8, wherein the reduction unit starts decreasing the fuel octane number when a predetermined period of time has elapsed since the beginning of the augmenting control.

11. The apparatus according to claim 10, wherein the predetermined period of time is a period of time between a time when the augmenting control begins and a time when the EGR gas quantity increases through the augmenting control and becomes stable.

12. The apparatus according to claim 11, wherein the EGR system includes an EGR control valve for changing the EGR gas quantity, and
wherein the apparatus further comprises:
a parameter detection unit that detects at least one of an intake air quantity of the internal-combustion engine, a pressure in the intake passage, and an angular position of the EGR control valve; and
a predetermined time period setting unit that sets the predetermined period of time on the basis of the at least one of the detected intake air quantity of the internal-combustion engine, pressure in the intake passage, and angular position of the EGR control valve.

13. The apparatus according to claim 10, wherein the predetermined period of time is a period of time between a time when the augmenting control begins and a time when an increment of the EGR gas quantity increasing through the augmenting control reaches a predetermined value, and
wherein the reduction unit gradually decreases the fuel octane number until the EGR gas quantity increases through the augmenting control and becomes stable.

14. The apparatus according to claim 10, wherein the predetermined period of time is a period of time between a time when the augmenting control begins and a time when the fuel octane number increases through the augmenting control and becomes stable, and
wherein the reduction unit gradually decreases the fuel octane number at a speed in accordance with a speed at which the EGR gas quantity increases through the augmenting control.

15. A method for controlling an internal-combustion engine, the method comprising:
detecting knocking in the internal-combustion engine;
increasing an EGR gas quantity of EGR gas in a case where the knocking is detected, a part of exhaust gas being circulated into an intake passage as the EGR gas;
increasing a fuel octane number of fuel supplied to a cylinder in the case where the knocking is detected;
decreasing the fuel octane number after the fuel octane number has been increased; and
maintaining the EGR gas quantity so as to prevent the knocking in the internal-combustion engine after the EGR gas quantity has been increased.

16. The method according to claim 15, wherein the EGR gas quantity and the fuel octane number are increased at the same time.

17. An apparatus for controlling an internal-combustion engine, the apparatus comprising:
a knocking detector to detect knocking in the internal-combustion engine;
an augmenting controller to increase an EGR gas quantity of EGR gas and a fuel octane number of fuel supplied to a cylinder in a case where the knocking detector detects the knocking, a part of exhaust gas being circulated into an intake passage as the EGR gas;
a reducer to decrease the fuel octane number after the fuel octane number has been increased; and
a maintainer to maintain the EGR gas quantity so as to prevent the knocking in the internal-combustion engine after the fuel octane number has been increased.

* * * * *